United States Patent Office 3,071,873
Patented Jan. 8, 1963

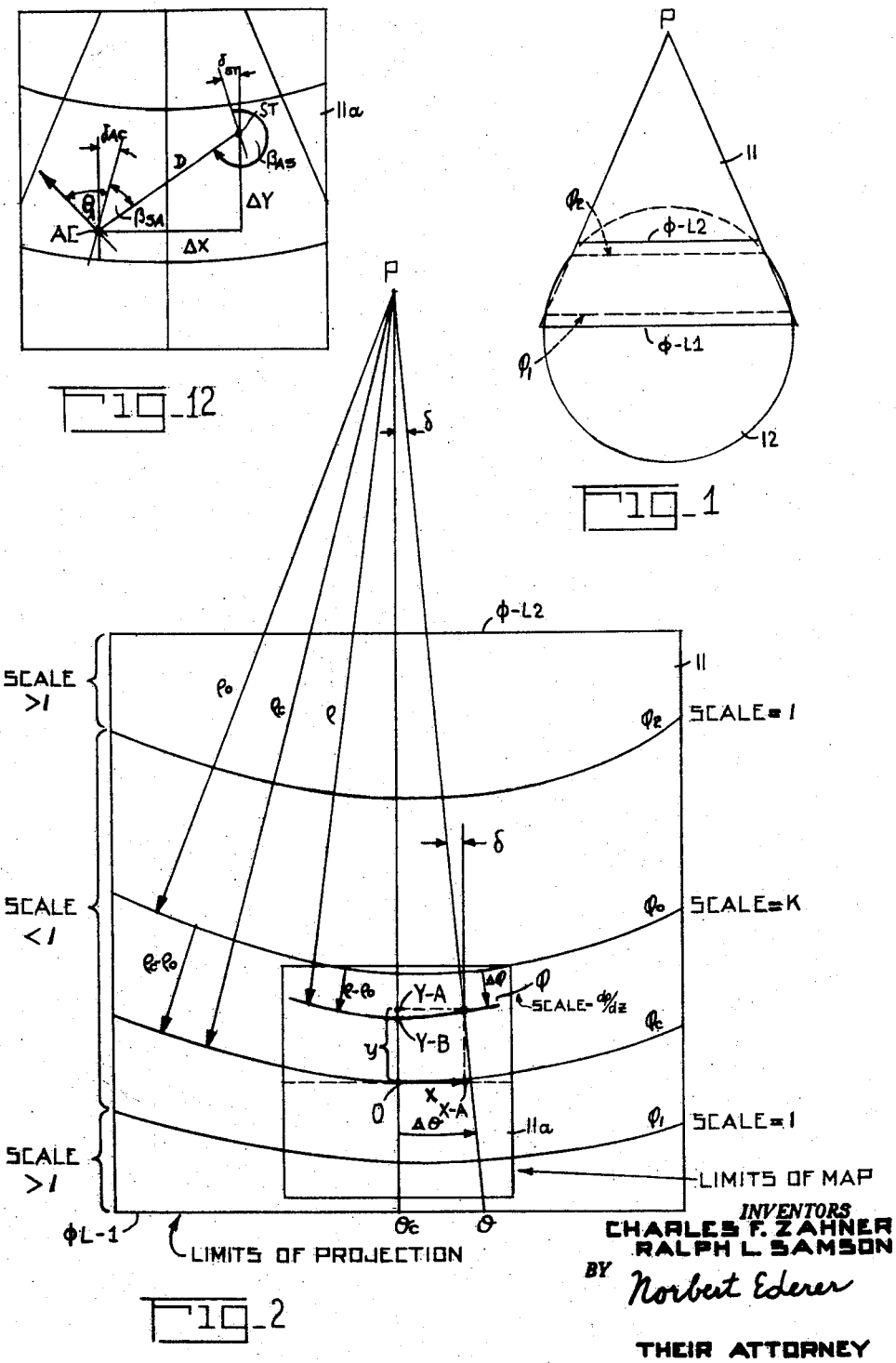

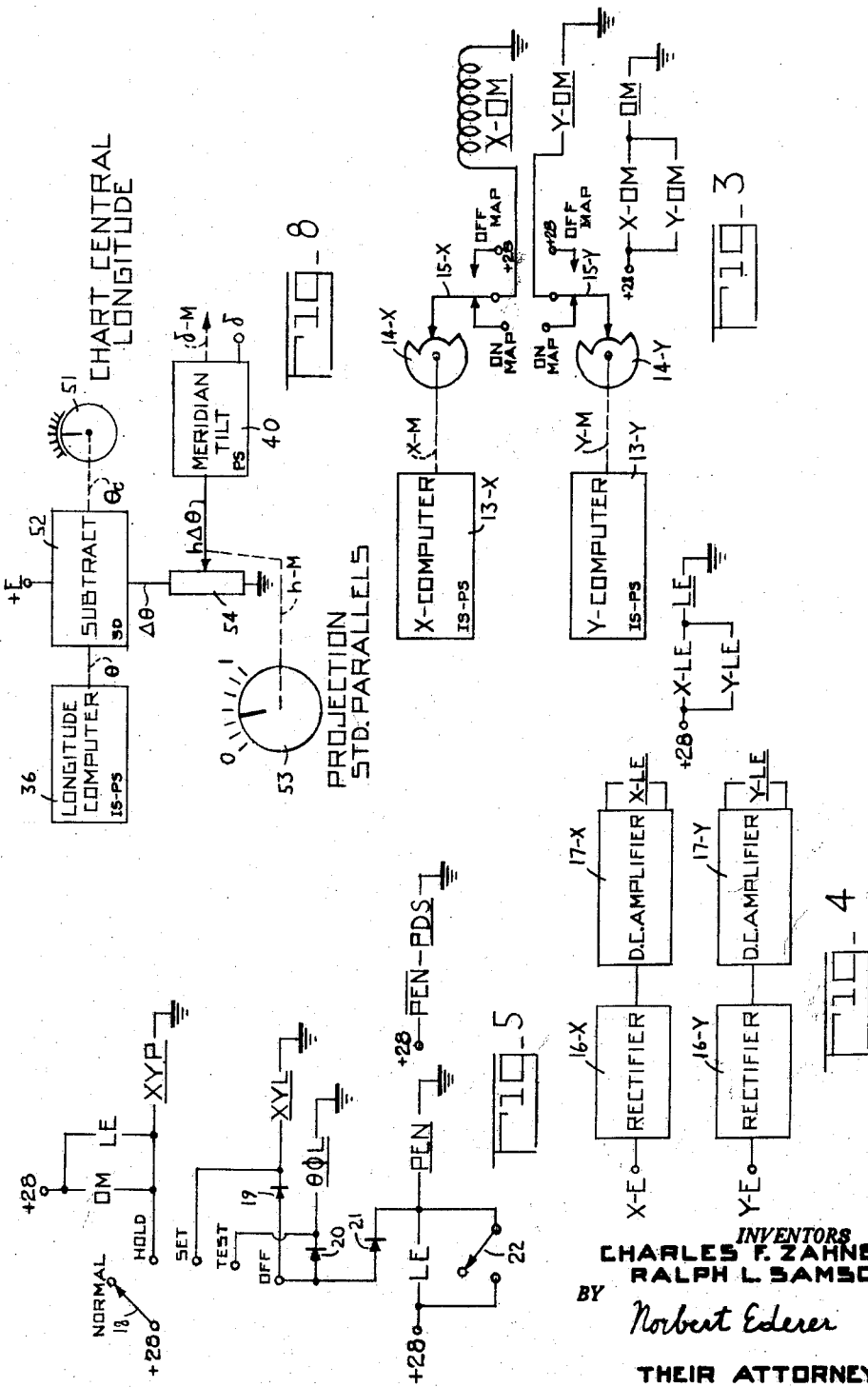

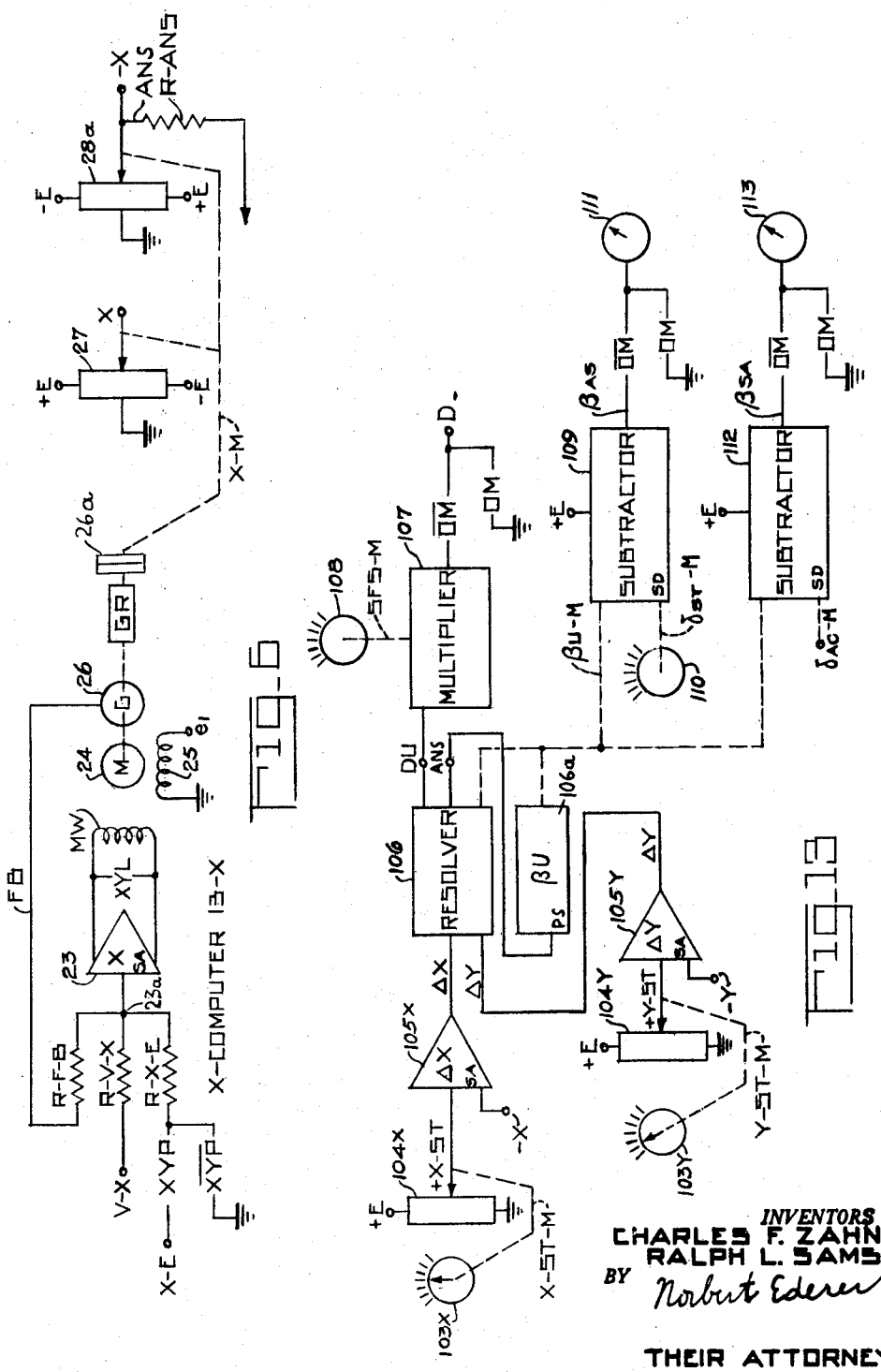

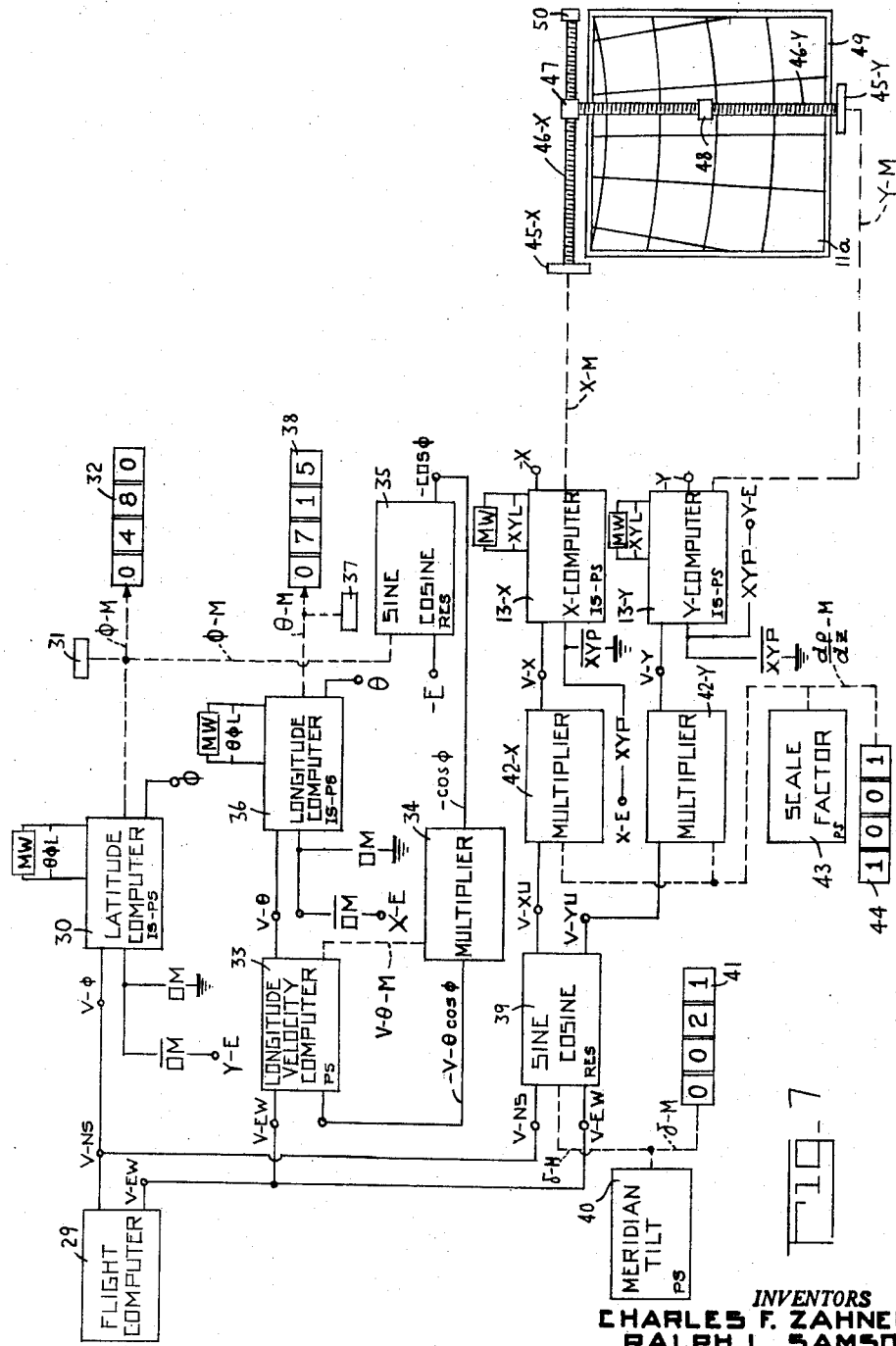

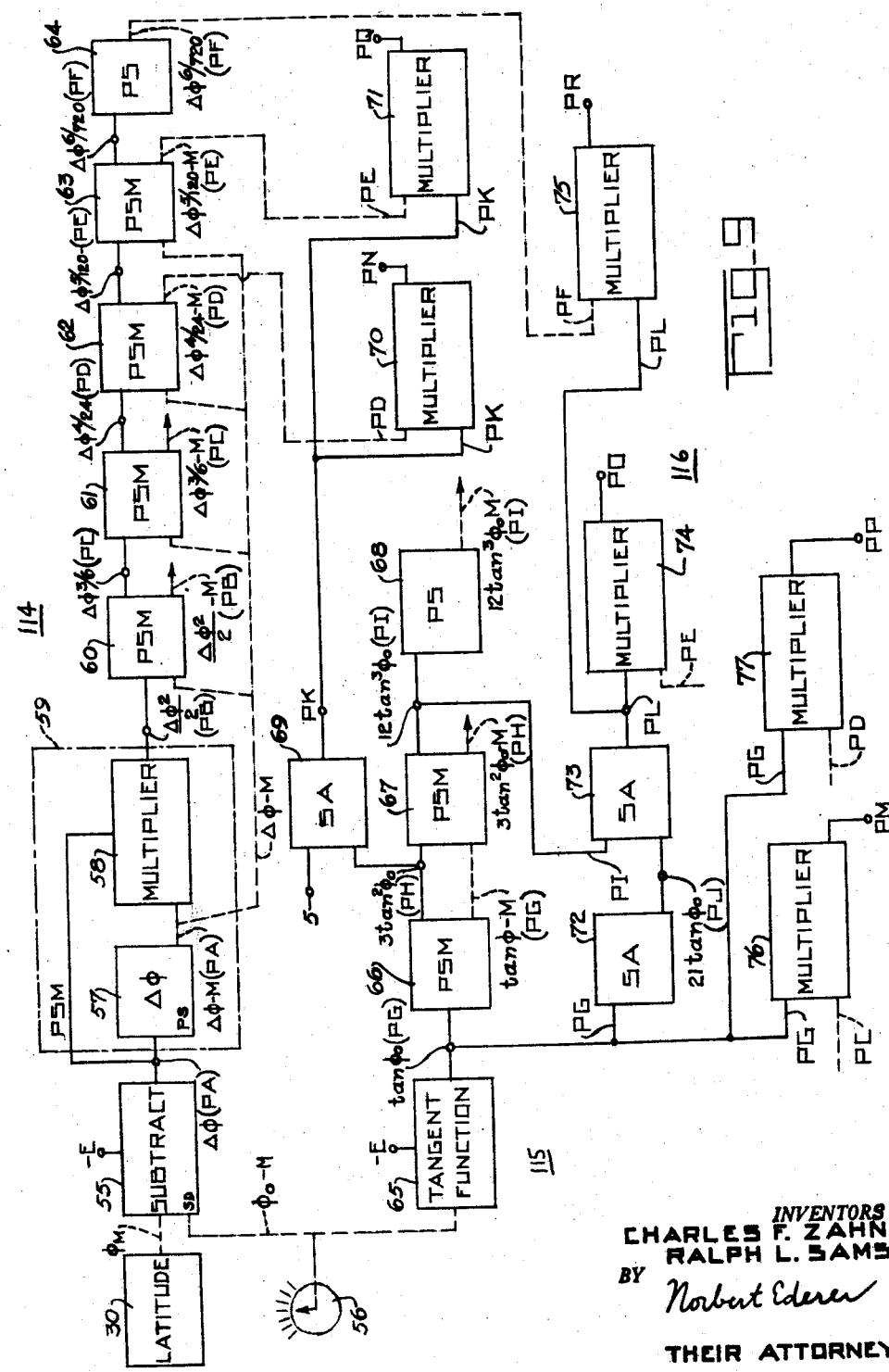

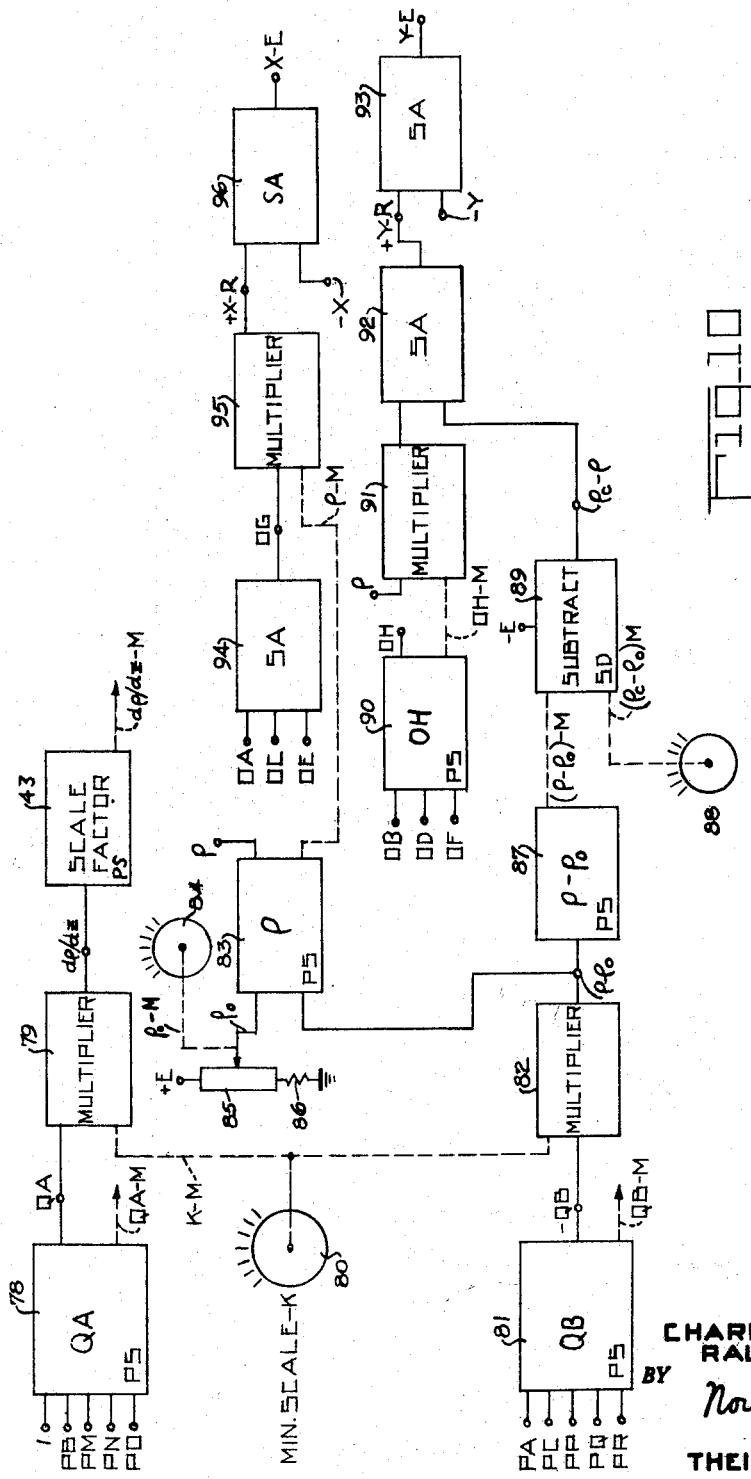

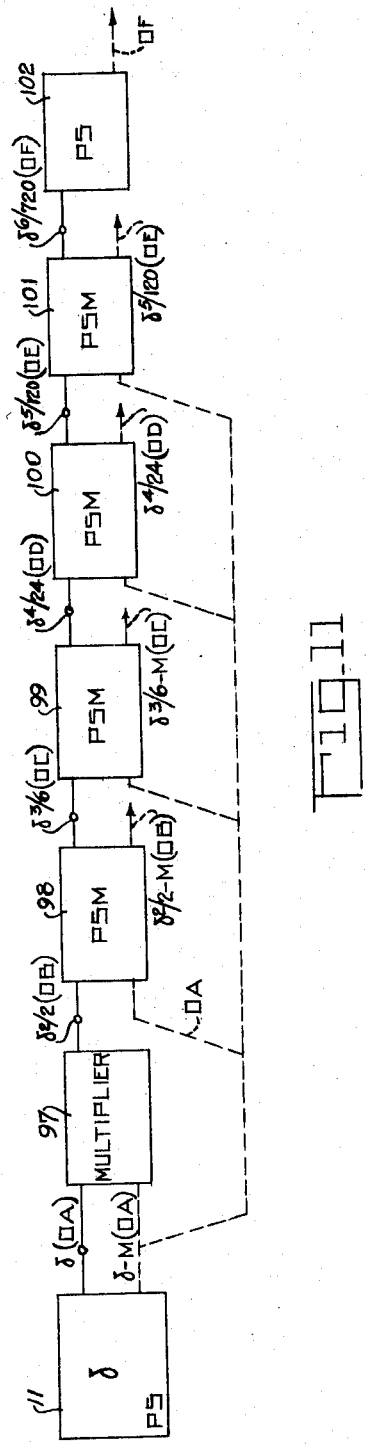

3,071,873
CHART RECORDING SYSTEM
Charles F. Zahner, Clifton, and Ralph L. Samson, Wyckoff, N.J., assignors to Curtiss-Wright Corporation, a corporation of Delaware
Filed Feb. 5, 1960, Ser. No. 6,989
31 Claims. (Cl. 35—10.2)

This invention relates to apparatus for navigational training, and more particularly is concerned with apparatus for recording and indicating the flight location and path of a simulated or actual aircraft.

Apparatus of the general character contemplated by the present invention is known in the art, examples being the U.S. Patents 2,829,446 granted to Cutler et al. on April 8, 1958, and 2,878,585, granted to J. W. Steiner on March 24, 1959. In these patents, a flight computer provides, on a continuous basis, electrical signals which represent the instant ground speed components of the craft along the North-South and East-West directions. Means are provided for integrating the ground speed components, which means generally comprise a pair of integrating motors. The latter impart respective motions in the horizontal and vertical directions to a recording pen which traces out the flight path on a navigation map or chart. As the map may represent a substantial portion of the globe it is necessary to correct for earth curvature, for the true vertical will generally not represent a meridian, nor will the true horizontal represent a parallel. The Cutler et al. and Steiner patents are directed to recording on so-called Lambert projection charts. The usual concept for computing the earth curvature correction in connection with Lambert conformal charts is the angle of meridian tilt. This is the angle formed by the intersection of the true vertical and the meridian at a given point. The mentioned patents disclose apparatus, which computes the angle of meridian tilt as a function of the instant flight position as plotted on the chart. The computed meridian tilt is utilized as a correction factor that is applied to the ground speed components. In this manner the flight path is traced out in agreement with the meridians and parallels of the map with an accuracy which had been heretofore considered as sufficient. An example of earth curvature correction as applied to Mercator projection charts is shown in U.S. Patent 2,853,800 granted to Cutler on September 30, 1958.

In navigational recording and indicating apparatus of the general character contemplated by the present invention, it is also the usual practice to utilize the ground speed signals to operate further integrators for computing and indicating the location of the flight in terms of degrees of latitude and longitude without reference to any map. It is desirable to base the latitude and longitude directly on the ground speed components rather than on the map data. In many instances the craft is outside the limits of any map whatsoever.

Also the computed latitude and longitude form a means for deciding that plotting on a particular map should commence, continue and terminate.

A principal difficulty with the independent computation of latitude on the one hand, and of the flight path as recorded on the chart on the other hand, is the fact that agreement of the two sets of computations cannot be maintained for a prolonged period of time. This is due to accumulation of errors in respective computing channels, also to inaccuracies inherent in the map. The projection is an attempt to represent a portion of a spherical body on a plane surface and this cannot be done absolutely correctly everywhere on the map.

The fact of disagreement of map plot and latitude and longitude indication has heretofore been accepted. This is because the flight paths had been generally limited to the confines of a single map. The present invention contemplates flight courses that traverse major portions of the globe and therefore a succession of maps, with or without intervals during which the flight is not within the confines of any map. In the latter case reliance must be had exclusively on the latitude and longitude indicators. Disagreement in the two forms of data presentation becomes a serious problem under such circumstances, as it is not known which of the data is most reliable and can therefore be used as basis for commencing the plotting on a new map.

It is a general object of the present invention to overcome the shortcomings of the prior art approaches to flight data presentation.

A further and more specific object of the present invention is to maintain in agreement flight location and course data as they appear on a flight chart on the one hand, and as they are presented by latitude and longitude indications on the other hand.

Another object of the invention is the provision of means for presenting the flight location data with a high degree of accuracy.

Briefly stated, in accordance with the invention, map plotting data and latitude and longitude data are computed on the basis of ground speed components, as in the prior art. However, the data most accurate at any given instant are utilized to force the presentation of the other data into agreement. When the flight is outside of the confines of a map, the latitude and longitude data are most accurate, and are utilized to prepare the map plotting computer to commence recording on the map, when and if the flight should enter the same. Upon such entry, the map plot data become more accurate. The map represents a more limited portion of the globe as compared to the latitude and longitude indicators, which in a sense represent the entire globe. The map therefore has better resolution. Accordingly as the flight proceeds within the confines of the map, the map data are used to force the latitude and longitude indications into agreement. As the flight leaves the map confines, the latitude and longitude indications resume as masters and the map plot as slave.

A feature of the invention is the improved and more accurate computation of the earth curvature correction applied to Lambert projection charts. The present invention takes into account, in addition to meridian tilt angle computation, the non-uniformity of the map scale. In this respect the invention presents an improvement upon apparatus of the Cutler et al. and Steiner patents.

A further feature of the invention resides in the improved and more accurate computation of the ground distance of the aircraft from a radio station and also in the computation of relative bearing angles with respect to such station. The invention takes into account non-uniformity of the map scale and also the meridian tilt at both the aircraft and the station. In this respect the invention presents an improvement upon the apparatus of the Steiner patent.

These and other objects, advantages and novel features of the invention will be better understood from a consideration of the following more detailed specification, of which the appended claims form a part, when considered together with the accompanying drawings, in which:

FIGS. 1 and 2 illustrate the mathematical and geographical relations governing the Lambert conformal projection;

FIGS. 3, 4 and 5 are partly logical and partly schematic drawings of relay energization circuitry utilized in the apparatus of the invention;

FIG. 6 is a schematic drawing of typical servo circuitry utilized in the apparatus of the invention;

FIG. 7 is a logical drawing of the principal apparatus of the invention;

FIG. 8 is a logical drawing of the circuitry for actuating the meridian tilt computer of FIG. 7;

FIGS. 9 and 10 are logical drawings of the apparatus for computing scale factor correction of FIG. 7 and of computing error signals utilized by the apparatus of FIG. 7 and of other drawing figures;

FIG. 11 is a logical drawing illustrating the manner of generation of certain signals utilized by the apparatus of FIG. 10;

FIG. 12 is an illustration of the geographical and mathematical relations governing the computation of aircraft to station ground distance and bearing angles; and FIG. 13 is a logical drawing of the apparatus for computing such ground distance and bearing angles.

The Lambert Projection (FIGS. 1 and 2)

For an appreciation of the invention, it is best to begin with the creation of Lambert projection maps. Referring to FIG. 1, the projection is made by the intersection of a cone 11 with a sphere 12 which represents the earth. The pole point P of the projection is placed above the North pole, for purposes of preparing northern hemisphere charts, and would be placed below the South pole for southern hemisphere charts. The cone 11 intersects the surface of the sphere 12 at two parallels $\phi_1$ and $\phi_2$, which are known as the standard parallels. The useful limits of the projection are parallels designated as $\phi$–L1 and $\phi$–L2. Beyond these limiting parallels the projection is too distorted to be of much use, and other projections, including possibly Lambert projections with pole points located elsewhere, may be employed. In the region near the poles, the so-called stereographic projection is most accurate, whereas in the regions near the equator the Mercator projection is most accurate.

The maps are prepared by developing the surface of the cone, as illustrated in FIG. 2. Here only a portion of the developed surface is shown in the form of the square 11; however the pole point P is included.

The standard parallels $\phi_1$ and $\phi_2$ are developed in the form of concentric circular arcs with the common center at the point P. In addition thereto several other parallels are indicated, also in the form of circular arcs with center at the pole point. These are parallels $\phi_0$, $\phi_c$ and $\phi$, whose significance will be explained immediately hereinafter. The radii of these circular arcs are indicated respectively as $\rho_0$, $\rho_c$ and $\rho$. These radii define meridians. The limiting parallels $\phi$–L1 and $\phi$–L2 are indicated as straight lines for simplicity; actually they should also be concentric arcs with center at the pole point.

The map scale is exactly unity at the standard parallels $\phi_1$ and $\phi_2$, as these parallels are common to the cone and sphere. Intermediate the standard parallels the scale is less than unity and reaches a minimum scale K at the parallel $\phi_0$. Above and below the standard parallels the scale is greater than unity. From the developed projection 11 maps are prepared, of which the map 11a is exemplary. The map is of square form and is characterized by a meridian $\theta_c$, which passes through the geometric center of the map 11a. Other maps may be centered about other meridians; for example another map might be prepared that is centered about the meridian defined by the radius vector $\rho_0$. The parallel passing through the center of the map 11a is the aforementioned parallel $\phi_c$. The intersection $\theta_c$ and $\phi_c$ defines the origin 0 of a Cartesian co-ordinate system for the map 11a, from which distances are reckoned in terms of the usual variables X and Y. The instant position of the aircraft may be taken as at the co-ordinates X—A and Y—A. The parallel $\phi$ and the meridian $\theta$ also define the aircraft location.

The following further variable will be of significance in subsequent consideration:

$\Delta\theta$. This is the angular deviation, in the direction of the parallels, of the location of the aircraft from the central meridian, equal to $\theta - \theta_c$.

$\Delta\phi$. This is the angular deviation, reckoned along the meridian, of the aircraft location from the parallel of minimum scale, equal to $\phi - \phi_0$.

$\delta$. This is the angle of meridian tilt formed by the intersection of the meridian $\theta$ and a vertical line drawn through the point of location of the aircraft.

$\rho$. This is the distance from the pole point P to the aircraft location.

$\rho_c - \rho_0$ and $\rho - \rho_0$. These are convenient mathematical concepts, useful in the computation performed by the apparatus of the invention, and are numerical differences expressed by the corresponding symbols. The radius vector $\rho$ is the radial distance from the pole point P to the aircraft location.

$d\rho/dz$. This is the scale applicable to any given point on the map. It is the rate of change of radial distance $\rho$ with respect to the parallels. The variable $z$ is simply the complement of the variable $\phi$.

System Relays (FIGS. 3, 4 and 5)

Referring to FIG. 3, there is shown an X computer 13–X, which drives through mechanical shaft connections X—M a cam 14–X that engages a movable contact 15–X. The latter in the indicated position of the cam engages a stationary "on map" contact. When the contact 15–X engages the elevation of the cam 14–X, the contact is positioned to engage an alternate stationary "off map" contact. This results in energization of an X "off map" (X—OM) relay, whose energization is traced from the +28 direct voltage source via the off map contact, the contact 15–X, through the relay coil to ground. The function of the X computer will be described hereinafter; for the time being it will suffice to state that it computes the instant X position of the aircraft with reference to the origin of the map 11a of FIG. 2. The X—OM relay is deenergized and energized corresponding to an on map and off map condition of the aircraft in the X direction, respectively. Stated differently, the X—OM relay is deenergized whenever the flight is within the confines of the map or is within the confines of the horizontal map extensions, and is otherwise energized.

The X—OM relay coil is illustrated both in conventional form and also with the symbol X—OM underlined. The remaining relays described hereinafter are simply designated by the symbol identifying the relay underlined. The "normally closed" (NC) contacts of a given relay are identified by the letter symbol of the associated relay with a bar thereabove. The "normally open" (NO) contacts of a relay are identified simply by the letter symbol of the associated relay with no bar above or below. Thus the NC contacts of the X—OM relay would be designated as $\overline{\text{X—OM}}$, whereas its NO contacts are simply designated as X—OM. This convention enables determination of the relay states practically by inspection. The convention is similar to those employed in the U.S. Patents 2,750,986 and 2,771,600. "Normalcy" as considered herein refers to the state of the relay with all sources of energization removed.

A Y off map (Y—OM) relay is energized under entirely analogous circumstances. Its excitation circuitry is similar to that of the X—OM relay, as may be seen by the simple substitution of the symbol Y for the symbol X in the corresponding parts. An off map (OM) relay is energized upon energization of at least one of the X—OM and Y—OM relays. Its relay coil is connected on the one side to ground and on the other side through an "or" circuit including NO contacts of the X—OM and Y—OM relays in parallel to the +28 volt source. The OM relay is thus energized whenever the aircraft is outside of the confines of the map.

Referring to FIG. 4, there are shown energization circuits for an "X large error" (X—LE), "Y large error" (Y—LE) and a "large error" (LE) relay. "Large error" signifies that there is a large error between the actual position of the aircraft and the instant position of the plotting pen that records the flight path on the map. Such a condition will exist under the corresponding "off map" conditions, but may also occur under "on map" conditions, for example when plotting maps are exchanged, and the adjustments corresponding to the newly inserted map have not as yet been completed.

The LE relay is energized through an "or" circuit including NO contacts of the X—LE and Y—LE relays in a manner analogous to that of the OM relay. The X—LE and Y—LE relays are energized through analogous channels, as may be recognized by the substitution of the symbol Y for the symbol X in the respective channels. An X error (X—E) alternating analog signal is applied to a rectifier 16–X which biases a direct current amplifier 17–X. The X—LE relay is connected in the output circuit of the amplifier. The arrangement is such that the relay is energized provided the X—E signal attains a minimum amplitude, irrespective of sense. The derivation of the X—E and Y—E signals will be described hereinafter.

Referring to FIG. 5, an instructor operated selector switch 18 is connected to the +28 volt source. It is operable to select five modes of operation by way of energizing and deenergizing the indicated relays XYP, XYL, θφL, PEN, and PDS. The five modes of operation are "normal," "hold," "set," "test," and "off." They are selected by engagement of contact 18 with the respectively like-named stationary contacts. In the "normal" condition the X and Y computers 13–X and 13–Y act as masters for certain latitude and longitude computers 30 and 36 encountered hereinafter, while the flight path is within the confines of the map, as briefly described in the introductory part of the specification. Also in "normal" operation, in the off map or large error conditions, the latitude and longitude computers act as masters for the X and Y computers. In the "hold" condition the latitude and longitude computers act as masters for the X and Y computers, irrespective of the on map or off map conditions. The set condition is generally selected for setting up stations on a map and for changing maps. In the test condition the X and Y computers continue their normal function but the latitude and longitude computers are locked. The test condition is rarely selected; one instance where it might be selected is where the flight path is within the confines of a detailed map covering a relatively small area. This for example might be in the immediate proximity of the airport where latitude and longitude remain substantially constant, so that no earth curvature correction is required. In the off condition all four computers are locked and map plotting ceases. This condition may be selected to "freeze" the problem, so that the instructor may confer with the student and point out to him the errors that the latter has made. Thereafter the problem may be resumed at the point of interruption. The operational modes will be better understood from the further description.

The "XY position" (XYP) relay energization circuit is an "or" circuit including parallel connected NO contacts of the OM and LE relays and switch 18 in the hold position. The "XY locator" (XYL) relay is energized with switch 18 in the set or off positions. The energization path from the "off" contact includes a blocking diode 19 which functions to prevent spurious θφL relay energization when switch 18 is in the set position. The "θφ locator" (θφL) relay is energized with switch 18 in either the "test" or "off" positions. The latter energization circuit includes a similar blocking diode 20, which functions to prevent spurious energization of the relay when the PEN relay is energized while switch 18 is in "normal," "hold" or "set." The PEN (pen lift) relay is energized with switch 18 in the off position through a further blocking diode 21 which is provided to prevent spurious energization of the XYL and θφL relays. Alternatively the PEN relay may be energized under large error conditions through the indicated NO contact of the LE relay or upon manual closure of a pen lift switch 22 by the instructor. The pen in question is of course the recording pen; actually the pen is operated to drop rather than lift when activated in the sense that with power disconnected the pen will not engage the recording map surface. To this end a pen drop solenoid (PDS) is energized through the indicated NC contact of the PEN relay

*Typical Computing Circuit (FIG. 6)*

The detailed circuitry of the X computer 13–X is illustrated in FIG. 6. It is typical of other computing systems illustrated in simple rectangular or triangular block form. The X computer operates as an integrating servo under on map conditions and as a position servo under off map or large errors conditions. In the latter case it is slaved to the latitude and longitude computers. The computer includes a summing amplifier 23 to whose input summing junction 23a are applied an external X velocity (V—X) integrand signal through a summing resistor R—V—X, an internal velocity feed-back signal FB through a summing resistor R—FB, and the X error signal X—E through the indicated NO contact of the XYP relay and a summing resistor R—X—E. The latter signal is applied only when the computer operates as a position servo, in which case the X—E signal slaves the servo to the latitude and longitude computers. As will be seen hereinafter the X—E signal is composed of the position signal normally applied to a position servo and of the answer signal normally applied to a position servo, and in fact is the difference of these. With the XYP relay deenergized, the resistor R—X—E is grounded through the indicated NC contact of the relay, and the servo operates as an integrating servo.

In the interest of simplicity a signal, the source that supplies such signal, an output terminal from which the signal is available, an input signal to which such signal is applied and any line carrying such signal are all identified by a common symbol, usually alphabetic. For example the signal V—X is assumed to be derived from V—X source and is applied to the indicated input terminal V—X. Reference to line FB implies that the line carries the signal FB. Conversely reference to the FB signal implies that the signal is carried by the FB line. This concept also extends to the structural member constituting the signal source. For example potentiometer 27 illustrated in FIG. 6 has a slider which provides an output signal X and consequently the output terminal, the line connected thereto and the potentiometer slider connected to such line are all deemed to be identified by the symbol X.

Other computing systems encountered hereinafter may receive more or less than the three signal inputs of the X computer. Some computing systems are simply summing amplifiers and not position or integrating servos, and are therefore designated by SA within the block. A computing system functioning as an integrating servo is designated by the letters IS contained within the block. A computing system functioning as a position servo is designated by the letters PS contained within the block. Since the X (and also Y) computers function alternatively as integrating and as position servos, they have been designated by the symbol IS—PS within the block, as illustrated in FIG. 3. The signals utilized herein are alternating analog voltages that are either in phase with a reference alternating voltage +E encountered hereinafter and therefore in phase opposition to an alternating reference voltage −E of like magnitude, or are respectively in phase opposition to and in phase with such voltages +E and −E.

The output of the summing amplifier 23 is applied to the control winding MW of a two-phase induction motor 24 whose other winding 25 is energized by a reference voltage $e_1$ that is 90° out of phase with the reference voltage +E. The operation of both position and integrating servos is explained in detail in United States Patent No. 2,731,737, granted to Robert G. Stern on January 24, 1956. Summarized briefly here, the motor 24 will rotate in one direction or the other depending upon the net phase of the external input signals applied to the summing amplifier 23, and at a velocity proportional to the magnitude of such net external input signal. The motor drives through mechanical connections a velocity feed-back generator 26 that generates the signal FB. It also drives a gear reducer GR that drives a slip clutch member 26a, that in turn drives through mechanical connections X—M the sliders X and −X of potentiometers 27 and 28a respectively. The slip clutch member 26a is provided for the X and Y computers, as their respective shafts X—M and Y—M are limited in travel as explained hereinafter. For some of the other computing systems the slip clutch member may be omitted as not required.

The connections X—M are deemed to be a mechanical X shaft position signal X—M as distinguished from the electrical voltage signal X which represents the same analog variable. Typically of other servos, the X computer thus provides bi-polar electrical output signal X and a shaft position signal X. Hereinafter a reference to a shaft position signal will be simply in the form of the shaft position variable X with the symbol M omitted. Reference to an electrical signal will be simply the signal X. The sign of the electrical signal will not be considered except where important. Computing systems which consist simply of summing amplifiers may provide bi-polar or uni-polar signals as required. Where a servo computing system is shown in block form with one or more of the electrical and shaft position signals omitted, it may be assumed that the omitted signal is not externally required. An omitted electrical signal may not even be generated, in which case the requisite structure may be deemed to be omitted, unless such signal is internally required, as for example the negative output signal to serve as answer signal for position servos. In the case of the X computer functioning as a position servo, the answer signal is passed through a rather complicated answer loop and ultimately appears as a component of the XE signal as previously mentioned and as explained more fully hereinafter. For other position servos the internal answer signal is derived from the answer potentiometer slider (−X) and is coupled as the signal ANS through a summing resistor R—ANS to the input junction 23a. The shaft position signal X actuates further mechanically driven members encountered hereinafter.

The potentiometers 27 and 28a are of the "linear" type. Their respective sliders X and −X provide the like-named output signals. The potentiometers are provided with grounded center taps, which correspond to an X=0 condition. Potentiometer 27 is energized by reference voltages +E and −E at its upper and lower ends respectively. The converse is true for the potentiometer 28a. The bipolar energization with grounded center tap is necessary because X deviation occurs in both directions from the origin defined by the grounded center tap. Other servo systems may require only uni-directional deviation from zero, in which case only one reference voltage would be applied to the potentiometer and the ground shifted to its other end. The variable represented by still other servos may not ever go down to zero. In such case the lower end of a potentiometer is returned through a further resistor to ground. These arrangements are well known in the art and are described in greater detail in the aforementioned Stern patent.

The motor winding MW is shortcircuited upon energization of the XYL relay, in which case the motor and all members driven thereby are locked or frozen in place. Motor windings of other servos subject to short-circuiting by shunting relay contacts are illustrated by the symbol MW enclosed in a rectangle with the short-circuiting relay contact in shunt. This is shown for example for the X computer 13–X in FIG. 7.

In addition to summing and integration, blocks of the subsequently described apparatus performed certain other mathematical function generation. Multiplication is performed by electrically energizing a potentiometer with the multiplier variable signal and its slider with a shaft position multiplicand signal. Thus a multiplier will receive electrical and shaft input signals and will deliver an electrical product output signal. Subtraction in some instances is performed by summing the minuend with the negative of the subtrahend electrical signals. In other instances, where greater precision is desired, the minuend and subtrahend signals are applied in the form of shaft position signals to a well known synchro-differential designated by SD within the subtractor block. The synchro-differential is also energized by a reference voltage that supplies an electrical difference output voltage. Division will be described with reference to the longitude velocity computer 33 of FIG. 7. Nonlinear functions, for example the tangent function, are generated by multipliers except that the selected potentiometer is not linear but has a suitable non-linear contour. The potentiometer may also be shunted in whole or in part by further resistors, or additional resistors may connect tap points of the potentiometer to ground. This method of generating nonlinear functions is well known in the art. Sinusoidal functions are generated in some instances by so-called sine-cosine potentiometers. More commonly herein they are generated by well known inductive resolvers, designated by RES within the block. Both forms of sinusoidal function generation are illustrated in the above mentioned Cutler et al. patent.

For a more detailed description of apparatus for computing linear and non-linear functions, reference is made to the above Stern patent and also to Patent No. 2,771,243 for "Apparatus for Simulating an Engine," granted to Wolin et al. on November 20, 1956.

*Typical Operation (FIG. 7)*

The apparatus of FIG. 7 will now be described with reference to a typical training exercise. This may begin with the take-off of the simulated aircraft. Under such circumstances the apparatus is in a quiescent state and the instructor will set in the latitude $\phi$ and the longitude $\theta$ of the point of departure. This he accomplishes by means of respective manual control knobs 31 and 37, which operate through respective mechanical connections $\phi$—M and $\theta$—M digital latitude and longitude indicators 32 and 38. Subsequently the $\phi$ and $\theta$ shaft position signals are under control of the latitude computer 30 and longitude computer 36 respectively. These operate the respective control knobs and indicators to provide continuous latitude and longitude indication of the aircraft.

At this time the switch 18 (FIG. 5) will normally be in the hold position so that the XYP relay will be energized and the X and Y computers 13–X and 13–Y (FIG.

7) will be slaved to the computers 36 and 30 by reason of the fact that the X and Y computers receive respective error signals through the indicated NO contacts of the relay. The instructor will insert the map 11a in a frame 49, and will insert the following map and projection constants: chart central longitude $\theta_c$ by means of a calibrated control knob 51 (FIG. 8), a factor $h$ which is a function of the standard parallels of the projection by means of a calibrated control knob 53 (FIG. 8), the chart minimum scale latitude $\phi_0$ by means of a calibrated control knob 56 (FIG. 9), the minimum scale factor K by means of a calibrated control knob 80 (FIG. 10), the quantity $\rho_0$ by means of a calibrated control knob 84 (FIG. 10), and the quantity $\rho_c - \rho_0$ by means of a calibrated control knob 88 (FIG. 10). The insertion of these chart and projection constants uniquely determines the origin of the XY system at the center of the chart 11a and places the pen block 48 at the location of the aircraft take-off. This will be apparent from subsequent considerations. The chart and map constants will generally appear as part of the map legend or may be supplied to the instructor in the form of tables. The insertion of the map and chart constants will also uniquely determine the positions of a meridian tilt ($\delta$) position servo (FIG. 7) and of a scale factor ($d\rho/dz$) position servo 43, which assume positions corresponding to the meridian tilt and scale factor values applicable to the point of departure. This will also be apparent from subsequent considerations. Visual indication of the meridian tilt and scale factor is provided by means of digital indicators 41 and 44 which are driven by the $\delta$ and $d\rho/dz$ shaft position signals.

Initially also the instructor had closed switch 22 (FIG. 5) to assure deenergization of the pen drop solenoid PDS. Accordingly as the pen block 48 (FIG. 7) is positioned to the point of departure no spurious trace will appear on the map 11a. The structural arrangement of the pen and pen solenoid is omitted, as it forms no part of the present invention. For a description thereof, reference is made to the co-pending application of Milton Eisenstark for "Dual Course Recorder" Serial No. 836,387, filed August 27, 1959, now Patent No. 2,948,850, dated August 9, 1960.

When the pen block 48 arrives at the point of departure, the instructor will open switch 22 (FIG. 5) thereby energizing the pen drop solenoid PDS to prime the same for continued plotting. He will also throw the switch 18 (FIG. 5) to its "normal" position to deenergize the XYP relay. The OM and LE relays are deenergized at this time in view of the on map condition of the pen and because of the absence of any error. The X and Y computers are now ready to integrate, whereas the latitude and longitude computers 30 and 36 now receive the signals YE and XE respectively through the indicated NC contacts of the OM relay. Thus the latitude computer 30 is slaved to the Y computer 13Y whereas the longitude computer 36 is slaved to the X computer 13X. The computers 30 and 36 are now primed to function as position servos, although they still receive integrand inputs.

As the flight takes off, a flight computer 29 delivers North-South and East-West ground speed signals V—NS and V—EW of non-zero value. These signals may be generated as shown in the Steiner patent for example. The V—NS signal is applied as a latitude velocity V—$\phi$ integrand input signal to the latitude computer 30. The conversion from miles per hour to degrees per hour is straightforward because of the linear relation of the two velocities. The latitude computer integrates this signal with respect to time to deliver electrical and shaft output signals $\phi$. The computer is slaved to the Y computer by virtue of application of the Y—E signal.

The signal V—EW is applied as an input signal to a longitude velocity computer 33 which converts the input velocity V—EW expressed in miles per hour to a longitude velocity V—$\theta$ expressed in degrees per hour. The relation of input to output is, (1) $$V-\theta = \frac{V-EW}{\cos \phi}$$

This computation is performed by well known division techniques. The latitude computer 30 applies the shaft position signal $\phi$ to a sine-cosine inductive resolver 35, which also receives the reference input voltage —E. Resolver 35 delivers output voltage —cos $\phi$ to a multiplier 34 that also receives shaft input signal V—$\theta$ from the computer 33. The output signal —V—$\theta$ cos $\phi$ of the multiplier 34 is applied as the answer signal to the computer 33. This computer therefore lacks an internal answer signal.

The longitude computer 36 integrates the signal V—$\theta$ and accordingly delivers electrical and shaft output signals $\theta$. This computer is slaved to the X computer by virtue of application of the X—E signal. As the computers 30 and 36 operate, continuous latitude and longitude indication is given by the indicators 32 and 38.

The V—NS and V—EW signals are also applied to an inductive resolver 39, which further receives the shaft input signal $\delta$ and delivers output signals V—XU and V—YU which are as yet not fully corrected, but only partially corrected for earth curvature effects. The partial correction performed by resolver 39 takes into account the meridian tilt structurally and functionally in the same manner as performed by element 34 of the Steiner patent. The expressions for the output voltages are:

(2) $\quad V-XU = V-EW \cos \delta - V-NS \sin \delta$ (3) $\quad V-YU = V-EW \sin \delta + V-NS \cos \delta$ The output signals of resolver 39 are further processed in analogous X and Y channels. The X channel will be described in detail whereas the Y channel is described implicity by the substitution of Y for X as applied to the X channel. The signal V—XU is applied to a multiplier 42X which also receives the scale factor shaft signal $d\rho/dz$ and delivers output voltage V—X fully corrected for both meridian tilt and scale factor. The signal V—X is applied as the integrand input signal to the X computer 13-X whose other input is presently grounded through the indicated NC contact of the XYP relay. The shaft output signal X is applied to a lead screw 46X, which drives a bearing block 47, which supports the Y lead screw 46Y, on which is mounted the pen block 48. Motion of the lead screw 46 displaces the lead screw 46Y and the pen block 48 in unison in the horizontal direction. At the same time the rotation imparted to the lead screw 46Y displaces the pen 48 in a vertical direction. In this manner the flight path is traced out on the map 11a. The lead screws are provided with respective disks 45X and 45Y which serve as mechanical stops to limit movement of the blocks 47 and 48. The disks are rigidly coupled to their respective lead screws. The block 47 of itself serves as a second limit stop for the block 48, while a stationary bearing block 50 serves as a second limit stop for the block 47. As an alternative to the lead screw drive a tape and pulley drive may be employed as shown in the above mentioned Eisenstark patent.

The flight path is plotted continuously until one of the four map limits is reached. If the upper map limit is reached first, the block 48 will be stopped by the block 47. The Y computer continues to integrate, but the mechanical shaft output will now remain fixed and since the electrical output —Y is due to the mechanical shaft output, it too will attain a limiting value; this is apparent from a consideration of FIG. 6. Referring also to FIG. 3, it is seen that the Y—OM and therefore the OM relays will now be energized. The cam 14Y will position the contact 15Y to the off map position but will move no further, as it too is driven by the connections Y—M. Referring to FIG. 5, with the energization of the OM relay, the XYP relay is also energized. Accordingly the lower inputs of the computers 30 and 36 are transferred to ground through the indicated NO contacts of the OM relay, and at the same time the lower inputs of the computers 13X and 13Y are connected to their respective error signals through the indicated NO contacts of the XYP relay. The latitude and longitude computers now function as pure integrators and as masters for the Y and X computers which now receive position error signals in addition to their integrand signals.

The aircraft is now within the upper vertical extension of the map. If the instructor does nothing further, the pen 48 will track along the upper horizontal edge of the frame 49, assuming that the flight path has a horizontal component. The pen may now continue to trace along such limiting edge until the error signal is sufficiently large to energize the LE relay, whence the pen drop solenoid is deenergized and the pen is lifted from engagement with the map 11a. The pen block 48 will continue to travel until the aircraft leaves the horizontal map extensions as reflected by engagement of the block 47 with stops 45X or 50. Thus the pen block comes to rest in one of the four corners of the map when the aircraft is outside of both the horizontal and vertical map extensions. It is obvious that an entirely analogous set of events would have taken place had any of the other three limiting conditions been first reached. Whether an X or a Y limit is reached first, ultimately the second limit will be reached, and both the X—OM and Y—OM relays will be energized and the pen drop solenoid PDS will be deenergized.

The description so far has been slanted towards use of the invention with a flight simulator for navigational training in the sense that reference has been made to instructor, student, and training exercise. This will be continued. However, it should be understood that the invention may be used in connection with actual airplanes. For example the invention could be used by the navigator, who would do whatever both the instructor and student are called on to do. As another example the invention could be used for ground recording on the basis of data received from the aircraft via radio communication.

As the pen 48 approaches or reaches the first limit, say again engagement of blocks 47 and 48, or the second limit, namely one of the four corners of the map, the instructor may do one of the following:

(1) He may remove map 11a and replace it by another map that geographically overlaps the first map. He will then insert new map constants, and possibly even new projection constants. This will result in large error, the pen 48 will be lifted, and will be caused to travel to the location required by the new map. Also because of the large error, the XYP relay will be energized or will continue to be energized as the case may be, until the pen finds its required location. During this time interval the latitude and longitude computers will act as masters and the X and Y computers as slaves. As soon as the large error condition is removed, the pen will drop once more to resume plotting; consequently the XYP relay will be deenergized. Since there is an on map condition again, the off map relay will be deenergized. At this point the X and Y computers resume as masters and the latitude and longitude computers resume as slaves, and plotting continues as before. This procedure may be repeated over any number of succession of maps until the flight lands.

(2) The instructor may not require any further plotted record of the flight. In this case he does nothing more. The latitude and longitude computers continue to operate as masters and the indicators 32 and 38 continue to reflect latitude and longitude respectively. The pen block 48 comes to a stop by engagement of either block 47 or of disk 45Y, assuming that the flight continues within the confines of the vertical extensions of the map. If the flight path also has a horizontal component, the pen will wind up at one of the four corners of the map.

(3) The instructor may replace the original map 11a with another one that represents a more remote area and has no geographical overlap with the original map. This would be a map covering an area which the aircraft is expected to traverse later on. The instructor will insert the newly required map constants or even projection constants, and the pen 48 under the influence of error signals applied to the X and Y computers, will travel to that corner of the map, or to that edge of the map which is nearest to the position of the aircraft. Thus the plotting equipment is prepared for renewed plotting. Under these circumstances the error is large and the pen will be lifted, avoiding any spurious trace. The pen will remain in the just assumed location until the flight path enters one of the horizontal or vertical extensions of the chart. At this time the pen will track along one of the edges in accord with the flight path in the particular extension. Finally, the flight path enters the map area. At this point the X and Y comptuers will become masters once more and the latitude and longitude computers slaves once more and the further events are as before.

It should be appreciated that the instructor may adopt alternative (3) after events have taken place along the lines of alternatives (1) or (2). Additional possible modes of successive operations may be evolved from a succession of the above three alternatives. These are obvious from the preceding description, and need not be further described.

To complete the description of FIG. 7, it should be noted that the motor windings of the computers 30 and 36 may be short-circuited through the indicated NO contacts of the $\theta\phi L$ relay. Similarly the motor windings of the X and Y computers may be short-circuited through the indicated NO contacts of XYL relay. When the computers 30 and 36 act as masters their respective lower inputs are grounded through the indicated NO contacts of the OM relay, and when acting as slaves the YE and XE signals are applied to such lower imputs through respective NC contacts of the OM relay. When the X and Y computers act as masters their respective lower imputs are grounded through the respective indicated NC contacts of the XYP relay, and when acting as slaves the lower inputs receive the X—E and Y—E signals through the respective indicated NO contacts of the XYP relay.

*Meridian Tilt Computation (FIG. 8)*

The computation of the meridian tilt angle $\delta$ is particularly simple because it may be expressed in terms of the longitude as follows:

(4) $$\delta = h(\theta - \theta_c) = h\Delta\theta$$

The new constant $h$ arises out of the manner in which the Lambert projection is created, referring to FIGS. 1 and 2. It is a function of the standard parallels of the projection, and is given by (5) $$h = \frac{\log \cos \phi_1 - \log \cos \phi_2}{\log \tan \frac{z_1}{2} - \log \tan \frac{z_2}{2}}$$

The angles $z$ are the complements of the corresponding angles $\phi$. It will be convenient to utilize the angles $\phi$ and $z$ concurrently hereinafter.

Referring to FIG. 8, shaft position signal $\theta$ is obtained from the longitude computer 36 and is applied as an input signal to a synchro-differential subtractor 52 which also receives shaft position signal $\theta_c$ obtained from a calibrated control knob 51, that is provided with a dial graduated in terms of chart central longitude. The subtractor 52 also receives input reference voltage $+E$ and delivers output signal $\Delta\theta$ which is applied to the upper end of a linear potentiometer 54 whose lower end is grounded. A calibrated control knob 53 is provided with a scale graduated in terms of $h$, which incidentally varies intermediate of the indicated limits of zero and one. The shaft position signal $h$ is derived from knob 53 and is applied to the slider of the potentiometer 54 to obtain input signal $h\Delta\theta$ for the meridian tilt position servo 40, which in turn produces shaft position and electrical outputs $\delta$. The manner of generating the signal $h\Delta\theta$ is typical of the multiplication technique used herein.

*Scale Factor Computation (FIGS. 9 and 10)*

The scale factor computation is based on the relation of $\rho$ and $z$. For $\rho_0$ this is given by (6) $\qquad \rho_0 = K \tan z_0 = K \cot \phi_0$ $K$ is the aforementioned minimum scale factor, given by the expression (7) $\qquad K = \dfrac{\left(\tan \dfrac{z_0}{2}\right)^b \sin z_1}{\left(\tan \dfrac{z_1}{2}\right)^h \sin z_0}$ The relation of $\rho$ and $\phi$ more generally is given by (6a) $\qquad \rho = \rho_0 - K \tan(\phi - \phi_0) = \rho_0 - K \tan \Delta\phi$ or $\qquad \rho - \rho_0 = -K \tan \Delta\phi$ From Equation 6a, there follows at once the expression for the scale factor (8) $\qquad d\rho/dz = -d\rho/d\phi = K \sec^2 \Delta\phi$ The precision of scale factor computation is improved by expanding the expression for $d\rho/dz$ in a power series, terminating with a fifth power term in $\Delta\phi$ as expressed in (9)

$$d\rho/dz = K\left[1 + \frac{\Delta\phi^2}{2} + \frac{\Delta\phi^3}{6}\tan\phi_0 + \frac{\Delta\phi^4}{24}(3\tan^2\phi_0 + 5) + \frac{\Delta\phi^5}{120}(12\tan^3\phi_0 + 21\tan\phi_0)\right]$$

The parameter $\rho$ is not necessary for the scale factor computation, but is necessary for the computation of the error signals, described subsequently. Since many of the terms computed for $d\rho/dz$ are also utilized in the computation of $\rho$, the description of the latter computation will be included with the description of the computation of $d\rho/dz$, and $\rho$ will be considered an earth curvature correction factor for purposes of the invention. Equation 6a is not in a most suitable form for precise computation of $\rho$. Again a power series expansion in terms of $\Delta\phi$ increases the precision, as given in (10)

$$\rho - \rho_0 = -K\left[\Delta\phi + \frac{\Delta\phi^3}{6} + \frac{\Delta\phi^4}{24}\tan\phi_0 + \frac{\Delta\phi^5}{120}(3\tan^2\phi_0 + 5) + \frac{\Delta\phi^6}{720}(12\tan^3\phi_0 + 21\tan\phi_0)\right]$$

Equation 10 substitutes the variable $\rho - \rho_0$ for the variable in Equation 6. Again the incremental form of $\rho - \rho_0$ is preferred as more accurate. The power series is terminated with the sixth power term of $\Delta\phi$. Depending upon the accuracy desired, and also on the contemplated range of operation of the computing system, the power series of Equations 9 and 10 may be terminated with higher or lower order terms.

For convenience in the description, the several terms utilized in Equations 9 and 10 and the alphabetic signals respectively representing these terms, are presented in the following Table I.

TABLE I

| Mathematical Expression or Signal Equivalent | Signal |
|---|---|
| $\Delta\phi$ | PA |
| $\dfrac{\Delta\phi^2}{2}$ | PB |
| $\dfrac{\Delta\phi^3}{6}$ | PC |
| $\dfrac{\Delta\phi^4}{24}$ | PD |
| $\dfrac{\Delta\phi^5}{120}$ | PE |
| $\dfrac{\Delta\phi^6}{720}$ | PF |
| $\tan \phi_0$ | PG |
| $3 \tan^2 \phi_0$ | PH |
| $12 \tan^3 \phi_0$ | PI |
| $21 \tan \phi_0$ | PJ |
| PH+5 | PK |
| PI+PJ | PL |
| PC×PG | PM |
| PD×PK | PN |
| PE×PL | PO |
| PD×PG | PP |
| PE×PK | PQ |
| PF×PL | PR |

The alphabetic signals apply both to shaft position and electrical signals. In the drawings the mathematical terms and corresponding signals are indicated together. On this basis Equations 9 and 10 may be rewritten respectively as

(11) $\qquad \delta\rho/dz = K[1 + PB + PM + PN + PO] = K \cdot QA$

(12) $\qquad \rho - \rho_0 = -K[PA + PC + PP + PQ + PR] = -K \cdot QB$

The new terms QA and QB are the signals corresponding to the bracketed expressions in Equations 11 and 12 respectively.

The apparatus of FIG. 9 and part of FIG. 10 mechanizes the solution of the equations 9 and 10 as reexpressed in the form of Equations 11 and 12. Referring to FIG. 9, the circuitry may be conveniently divided into three channels 114, 115 and 116. Channel 114 computes $\Delta\phi$ and the higher power terms thereof, signals PA to PF. Channel 115 computes $\tan \phi_0$ and higher powers thereof, signals PG to PL. Channel 116 computes products of the terms derived from the channels 114 and 115, signals PM to PR. The further computations required to arrive at $\rho - \rho_0$ and $d\rho/dz$ will be described with reference to FIG. 10.

A calibrated control knob 56 applies shaft position signal $\phi_0$ to a subtractor 55 in channel 114 and also to a tangent function generator 65 in the channel 115. The subtractor 55 also accepts shaft position signal $\phi$ from the latitude computer and reference voltage signal $-E$ and accordingly delivers the PA output signal to the $\Delta\phi$ (PA) position servo 57 and also to a multiplier 58. Servo 57 delivers shaft position signal PA to the multiplier 58, which accordingly delivers the PB output signal. The combination of position servo 57 and multiplier 58 is typical of further units encountered and will be referred to as a PSM unit 59. Each PSM unit accepts an electrical input signal, here PA and the like-named shaft position signal, and also the electrical signal corresponding to the next higher order term, herein PB. The signal PB represents $$\frac{\Delta\phi^2}{2}$$

the factor in the denominator, herein two, is obtained by proper proportioning of the input resistance of the next succeeding stage. This manner of power series generation is described in greater detail in the above-mentioned Wolin et al. patent.

The shaft position PA signal is applied to successive PSM units 60, 61, 62, and 63. These units receive in order electrical input signals PB, PC, PD and PE and deliver in order the electrical output signals PC, PD, PE and PF, and the mechanical output signals PB, PC, PD and PE. The PF electrical output signal of the last PSM stage 63 is applied to a position servo 64 included in the channel 114 which accordingly delivers shaft position output signal PF.

Considering the channel 115, the tangent function generator 65, which may be similar to the unit 108 of the Steiner patent, delivers the PG signal to a PSM unit 66 that provides electrical output signal PH and shaft position signal PG. The latter is applied to a PSM unit 67. The former is applied to the PSM unit 67, which accordingly delivers the electrical PI signal as an input signal to the position servo 68, which in turn delivers the shaft position PI signal. The electrical PH signal is also applied to a summing amplifier 69, that further accepts a constant input voltage 5, which represents the numerical constant 5 in Equations 9 and 10. This may be achieved by the simple expedient of applying the reference voltage +E to the terminal 5 and properly proportioning the internal input resistor. Accordingly the summing amplifier 69 delivers the PK signal.

The PG signal is also applied as the sole input signal to a summing amplifier 72 that has the proper gain to provide the PJ output signal, which is applied to a further summing amplifier 73 that also receives the PI signal, and accordingly delivers the PL output signal. This completes the description of the channel 115.

The channel 116 includes multipliers 70, 71, 74, 75, 76 and 77. These multipliers accept in order electrical input signals PK, PK, PL, PL, PG and PG. These multipliers also accept in order shaft position input signals PD, PE, PE, PF, PC and PD. Accordingly the multipliers deliver in order electrical output signals PN, PQ, PO, PR, PM and PP.

The compuation of $\rho-\rho_0$ and $d\rho/dz$ is completed by part of the circuitry illustrated in FIG. 10, namely position servos 78 and 81, multipliers 79 and 82, position servo 87 and a minimum scale factor control knob 80 that is graduated in terms of minimum scale K, ranging generally from approximately 0.9 to unity. The position servos 78 and 81 provide the QA and QB signals respectively, both electrical and shaft position. The use of the servos 78 and 81 is a matter of convenience; however since only the electrical signals are utilized, they may be replaced by summing amplifiers if desired.

The servo 78 accepts input signals PB, PM, PN and PO and an additional signal 1 representing unity found in Equations 9 and 11. This term may be generated in the same manner as the constant 5 that is applied to the summing amplifier 69 of FIG. 9. Accordingly the servo 78 delivers the QA signal as an input to the multiplier 79, which also accepts shaft position signal K from the control knob 80 in turn delivers the desired output signal $d\rho/dz$. The latter is utilized to position the scale factor position servo 43.

The servo 81 accepts the signals PA, PC, PP, PQ and PR and accordingly delivers the QB signal expressed in negative form as —QB to the multiplier 82. The latter also accepts shaft position signal K from the control knob 80 accordingly delivers the desired output signal $\rho-\rho_0$ to position the servo 87 in accordance with $\rho-\rho_0$.

*Error Signal Computation (FIGS. 10 and 11)*

The approach used in the computation of the error signals X—E and Y—E is to recompute the X and Y signals as functions of $\rho$ and $\delta$, and then to compare them respectively with the —X and —Y signals obtained from the X and Y computers. The basic inter-relations governing this scheme are, referring to FIG. 2,

(13) $$X-R = \rho \sin \delta$$

(14) $$Y-R = \rho_c - \rho \cos \delta$$

The symbols X—R and Y—R represent the recomputed variables as distinguished from the computer derived variables —X and —Y. Since it is more accurate to utilize the variable $\rho-\rho_0$ in place of $\rho$, Equations 13 and 14 may be preliminarily reexpressed as

(15) $$X-R = [(\rho-\rho_0)+\rho_0] \sin \delta$$

(16) $$Y-R = \rho_c - [(\rho-\rho_0)+\rho_0] \cos \delta$$

As a further step in improving the precision of computation of Equation 16, the term $\rho_c$ is reexpressed in the form of $\rho_c - \rho_0$ leading to

(17) $$Y-R = (\rho_c-\rho_0) - (\rho-\rho_0) + [(\rho-\rho_0)+\rho_0][1-\cos \delta]$$

Even as reexpressed in the form of Equation 17 the accuracy of computation is not the best, for Equation 17 is still in essence the same as Equation 14 and as such represents the difference of two large numbers, very nearly equal, and involving a continuous variable, namely $\rho$. It might be noted that the same objection may be applied to other parenthetical terms of Equation 17. However the first term on the right hand side thereof, $\rho_c - \rho_0$ represents only constants and can be inserted as the ultimate difference rather than subtraction of the two numbers. The second and also the third parenthetical terms on the right hand side of Equation 17 namely $\rho-\rho_0$ are also computed as the ultimate difference, rather than by subtraction of two parameters.

In order to obviate the necessity for subtracting two numbers very nearly equal, cos $\delta$ is reexpressed in power series form terminating with the sixth power term as

(18) $$\cos \delta = 1 - \frac{\delta^2}{2} + \frac{\delta^4}{24} - \frac{\delta^6}{720}$$

It should be noted that the objectionable subtraction of two numbers very nearly equal resides in the last bracketed term of Equation 17, namely 1—cos $\delta$. This may be eliminated by substituting the expression for cos $\delta$ of Equation 18 in Equation 17 to result in

(19) $$Y-R = (\rho_c-\rho_0) - (\rho-\rho_0) + [(\rho-\rho_0)+\rho_0]\left[\frac{\delta^2}{2} - \frac{\delta^4}{24} + \frac{\delta^6}{720}\right]$$

The power series type of expression is preferred for the further reason of higher computation accuracy. For this reason sin $\delta$ is also expressed in power series form, terminating with the fifth power term as

(20) $$\sin \delta = \delta - \frac{\delta^3}{6} + \frac{\delta^5}{120}$$

Then, substituting the expression for sin $\delta$ of Equation 20 in Equation 15, there results

(21) $$X-R = [(\rho-\rho_0)+\rho_0]\left[\delta - \frac{\delta^3}{6} + \frac{\delta^5}{120}\right]$$

As a matter of convenience, the power series terms of $\delta$ are tabulated side by side with the signals representing them.

TABLE II

| Mathematical Expression or Signal Equivalent | Signal |
|---|---|
| $\delta$ | OA |
| $\dfrac{\delta^2}{2}$ | OB |
| $\dfrac{-\delta^3}{6}$ | OC |
| $\dfrac{-\delta^4}{24}$ | OD |
| $\dfrac{\delta^5}{120}$ | OE |
| $\dfrac{\delta^6}{720}$ | OF |
| OA+OC+OE<br>OB+OD+OF | OG<br>OH |

The solution of Equations 15 and 21 is mechanized by the apparatus of FIG. 11 and part of the apparatus of FIG. 10. The signals OA to OF are generated by the apparatus of FIG. 11 to which reference is now made. The meridian tilt computer 40 delivers electrical and shaft position signals OA, both of which are applied to a multiplier 97 which accordingly delivers the OB signal. The shaft position OA signal is also applied to a succession of PSM units 98, 99, 100 and 101. These units, in order accept the electrical input signals OB, OC, OD and OE and deliver the respectively like-named mechanical output signals. The PSM units also deliver, in order electrical output signals OC, OD, OE and OF. The OF signal is applied as an input signal to a position servo 102 which delivers the shaft position OF signal.

Referring again to FIG. 10 the means for computing the error signals includes a calibrated control knob 84, which is graduated in terms of $\rho_0$ and delivers a shaft position signal to the slider $\rho_0$ of a potentiometer 85 that is connected at its upper end to the reference voltage +E and at its lower end through a resistor 86 to ground. The provision of resistor 86 is in the interest of sensitivity control of the $\rho_0$ signal, as this signal does not go down to zero. The $\rho_0$ signal is applied to a position servo 83 which also accepts the input signal $\rho-\rho_0$ from multiplier 82 and accordingly delivers electrical and shaft position signals $\rho$.

A summing amplifier 94 accepts input signals OA, OC and OE and accordingly delivers output signal OG to a multiplier 95 which also receives the shaft position $\rho$ signal. Accordingly the multiplier 95 delivers the desired X—R signal to a summing amplifier 96 which also accepts the —X signal and delivers the X—E signal.

The shaft position signal $\rho-\rho_0$, is derived from the servo 87, as applied as an input signal to a subtractor 89 which also accepts shaft position signal $\rho_c-\rho_0$ from a control knob calibrated in terms thereof. The subtractor 89 further accepts the reference voltage +E and accordingly delivers the $\rho_c-\rho$ signal.

A position servo 90 accepts the OB, OD and OF signals and accordingly delivers the OH electrical and shaft position signals. The shaft position signal is applied to a multiplier 91 that also accepts the $\rho$ electrical signal and delivers an output signal to the summing amplifier 92, which further accepts the $\rho_c-\rho$ signal from the subtractor 89. The amplifier 92 accordingly delivers the output signal Y—R which is applied to a summing amplifier 93 that also accepts the —Y signal and accordingly delivers the YE signal.

The XE and YE signals are respectively applied to the X and Y computers under off map conditions. They are respectively applied to the latitude and longitude computers under on map conditions. A higher accuracy could be obtained by applying $\theta$ and $\phi$ error signals to the latitude and longitude computers. No harm is done by applying the XE and YE signals to the latitude and longitude computers, for when these computers finally fall in step with the X and Y computers, the error is reduced to zero. Thus application of the X—E and Y—E rather than $\theta$—E and $\phi$—E error signals to the latitude and longitude computers merely results in a slower falling in step. This is a second order effect.

As described, the X—R signal is generated by multiplying the shaft position signal $\rho$ with the electrical signal OG, whereas the output signal of the multiplier 91 is generated by multipling the electrical signal $\rho$ by the shaft position signal OH. If desired the multiplier 91 could be provided with a shaft position signal $\rho$ and an electrical signal OH instead, in which case the servo 90 could be replaced by a summing amplifier. As another alternative, the servo 83 could be replaced by a summing amplifier which provides merely electrical output signal $\rho$, in which case the summing amplifier 94 is replaced by a position servo to provide shaft position signal OG. Such interchangeability is true of many of the other computing systems herein encountered and shall be deemed as within the scope of the invention.

Ground Distance and Bearing Angle Computation
(FIGS. 12 and 13)

On a Lambert projection map, great circle paths are represented by straight lines. As applied to the United States for example, a transcontinental straight line map path, differs from the actual great circle path by approximately 0.1%. The angular accuracy is even better. This greatly facilitates ground distance and bearing angle computation.

For an appreciation of the mathematical computation performed by the apparatus of FIG. 13, reference is first made to FIG. 12 for an illustration of the geographical relations involved. The instant location of the aircraft is designated by AC and the direction of its heading by the arrow passing through AC. A radio aids station or similar reference location is designated as by ST, and the ground distance separating aircraft and station by D. The horizontal and vertical distances separating aircraft and station are designated by $\Delta X$ and $\Delta Y$ respectively. The distance D as measured to linear scale, that is without scale correction factor is given by $\sqrt{\Delta X^2+\Delta Y^2}$, where $\Delta X$ and $\Delta Y$ are also considered without scale factor correction. The uncorrected bearing angle (not illustrated) $\beta$-U is numerically equal to arctan $$\frac{\Delta Y}{\Delta X}$$

This angle may be corrected to reflect both the bearing angle of the station relative to the aircraft $\beta$-SA and the bearing angle of the aircraft relative to the station, designated as $\beta$-AS, simply by accounting for the meridian tilt angle at the aircraft and station respectively. This is a characteristic of the Lambert projection, and is not true of all projections in general. It arises out of the fact that great circle paths may be represented by straight lines. Since bearing angles are reckoned from the meridian in clock-wise direction the angle $\beta$-SA as illustrated is less than 180° and the aircraft meridian tilt angle $\delta$-AC must be subtracted from the angle $\beta$-U. On the other hand, in the case of the station meridian tilt angle $\delta$-ST must be added to 360°—$\beta$-U. Obviously if the locations of aircraft and station were interchanged the converse computation would have to be performed; the sensing of the proper computation is performed by the apparatus automatcially by virtue of the signal polarities.

The heading angle $\theta_A$ is not computed by the described apparatus; it too may be computed by adding to or subtracting from the uncorrected heading angle formed by the heading arrow and the vertical line through AC the meridian tilt angle $\delta$-AC as required. Actually, in the form illustrated, the correct heading angle is 360°—$\theta_A$.

The apparatus of FIG. 13 is provided with a channel for computing ΔX and a channel for computing ΔY. Only the ΔX channel will be described explicitly, the ΔY channel being recognized by substitution of Y for X in the X channel. A calibrated control knob 103–X is graduated in terms of X position on the map and may be operated by the instructor to set in the X coordinate of the desired station. Control 103–X applies shaft position signal X—ST to the like-named slider of a potentiometer 104–X that is energized by the reference voltage +E at its upper end and is grounded at its lower end. The slider derived electrical signal X—ST is applied to a summing amplifier 105–X, which also accepts as an input signal the —X signal. Accordingly the amplifier 105–X produces output signal ΔX which is applied as an input to a resolver along with the second input signal ΔY. The resolver 106 provides an uncorrected ground distance output signal DU and a signal ANS, which serves as an answer signal for a position servo 106A that computes the angle β-U by rotating the resolver windings through its shaft position output signal β-U the extent necessary to reduce the answer signal to zero. Thus the position servo 106A is not provided with an internal answer signal, and moreover accepts no other input signal. The units 106 and 106A correspond structurally and functionally to the units 95 and 100—103 of the Steiner patent.

The DU signal is applied as an input signal to a multiplier 107, which also receives shaft position input signal SFS from a calibrated control knob 108 that applies the scale factor of the station. Accordingly the multiplier 107 delivers the output signal D representing corrected ground distance through the indicated NC contact of the OM relay, for utilization elsewhere in the training apparatus, as for example that of our co-pending application for Simulated Radio Aids Receiver, Serial No. 770,-208, filed October 28, 1958, now Patent No. 2,947,088 dated Aug. 2, 1960. Under off map conditions the output signal terminal D is grounded through the indicated NO contact of the OM relay to prevent false ground distance indication.

The shaft β-U signal is applied to each of subtractors 109 and 112. The subtractor 109 also receives from a calibrated control knob 110 the shaft position signal δ-ST representing the meridian tilt angle at the station. It further receives reference input voltage +E and accordingly delivers output signal β-AS that is applied through the indicated NC contact of the OM relay to an instrument 111 that reflects the angle β-AS in the off map condition. Instrument 111 is grounded through the indicated NO contact of the relay to avoid false meter indication.

The subtractor 112 additionally receives the shaft position signal δ, herein designated as δ-AC to differentiate from the signal δ-ST. The δ-AC signal is of course the output signal of the meridian tilt computer 40. The subtractor 112 is energized by the reference voltage +E and delivers electrical output signal β-SA which is applied to an indicating instrument 113 through the indicated NC contact of the OM relay. Under off map conditions the instrument 113 is grounded through the indicated NO contact of the relay to prevent false indications.

The instructor may operate the controls 103–X, 103–Y, 108 and 110 by reference to the map legend. Alternatively he may arrive at the proper settings by way of the following procedure. Before the training exercise commences, he will operate the switch 18 (FIG. 5) to the set position, thereby energizing the XYL relay and will close the switch 22 to prevent spurious plotting. This will lock the X and Y computers by short-circuiting their motor windings MW through NO contacts of the relay (FIG. 7). He will next operate the control knobs 31 and 37 (FIG. 7) to the latitude and longitude of the desired station. Next he throws switch 18 (FIG. 4) to the hold position to remove the short-circuits for the motor windings of the X and Y computers and at the same time render these computers slaves to the latitude and longitude computers 30 and 36 by virtue of energization of the XYP relay. The computing apparatus will now align itself so that the pen 48 comes to rest at the radio station and at the same time the scale factor indicator 44 (FIG. 7) will reflect the station scale factor and the meridian tilt indicator 41 (FIG. 7) will reflect the meridian tilt at the station. The X and Y station coordinates may be read off the map and inserted by operation of the controls 103–X and 103–Y (FIG. 13). The controls 108 and 110 (FIG. 13) may be set in accordance with the indications of the instruments 44 and 41. If greater precision is desired, the comparison may be made electrically by means of a voltmeter, that is the signal +X—ST is adjusted by means of the control 103–X until it balances the output signal of the X computer, and similarly for the other signals set in by operation of the remaining control knobs of FIG. 13. Corresponding values may be obtained for as many stations as desired, and these values may be set in during the course of the exercise. When the proper settings of the controls 103–X, 103–Y, 108 and 110 have been obtained by this procedure for all stations, the switches 18 and 22 (FIG. 5) may be replaced to their normal positions in readiness to commence plotting.

An alternate scheme for setting in radio stations is as follows. Before the training exercise commences, the switch 18 (FIG. 5) is placed in the off position thereby energizing the XYL, θϕL and pen relays. This locks in place the computers 30, 36, 13X and 13Y (FIG. 7), as their motor windings are short-circuited by NO contacts of the θϕL and XYL relays. The pen 48 is placed at the location of the radio aids station by manual operation of the lead screws 46–X and 46–Y. The disks 45–X and 45–Y may be conveniently used for this purpose. Next the switch 18 is placed in the normal position and since an on map condition exists, the switch 22 is closed to assure continued pen lift. The computers 13X and 13Y will act as masters for the computers 30 and 36. The latter pair of computers, and also the meridian tilt and scale factor computers 40 and 43 will be brought to settings in accord with the location of the pen 48. Incidentally, the scheme so far described may also be used for initial set in of the point of departure. The control knobs of FIG. 13 are next adjusted for matching of station values with the indicated values of FIG. 7 as in the preceding method.

It should be noted that the signal DU (FIG. 13) is corrected by insertion of the scale factor at the station. This is an approximation, as for strict accuracy the continuous variation of the scale factor between aircraft and station should be taken into account. However the approximation becomes better and better where the signal D is of principal importance, when the aircraft approaches the station.

*Conclusion*

From the aforegoing it will be seen that there has been provided, in accordance with the invention, chart recording apparatus characterized by high accuracy, especially in regard to accurate plotting of the flight path, computation of meridian tilt and of bearing angles. The described apparatus avoids disagreement between latitude and longitude as plotted on a chart and as recorded by latitude and longitude indicators. Several modifications of the invention have been described in the aforegoing description, but it should be understood that the invention is not limited to specific details of construction and arrangement thereof herein illustrated, as further changes and modifications may occur to those skilled in the art without departing from the spirit of the invention.

What is claimed is:

1. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

2. In aircraft course recording apparatus including a flight computer providing ground speed signals of the aircraft in flight along orthogonal directions: cooperating pen and conic projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

3. In aircraft course recording apparatus including a flight computer providing ground speed signals of the aircraft in flight along orthogonal directions: cooperating pen and Lambert projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

4. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said X and Y integrators for sensing "off map" and "on map" location of the flight; and means for applying said error signals to said $\phi$ and $\theta$ computers respectively under "on map" condition to force the $\phi$ and $\theta$ indications into agreement with the map flight location.

5. In aircraft course recording apparatus including a flight computer providing ground speed signals of the aircraft in flight along orthogonal directions: cooperating pen and conic projection map means for plotting the flight path; drive means for imparting relative motion as between said map and pen means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of one of said output signals; means for recomputing one pair of said output signals as functions of the other output signal pair; means for comparing the recomputed and the thereto corresponding original output signals respectively to provide a pair of error signals; means responsive to said X and Y integrators for sensing "off map" and "on map" location of the flight; and means for applying said error signals to said $\phi$ and $\theta$ computers respectively under "on map" condition to force the $\phi$ and $\theta$ indications into agreement with the map flight location.

6. In aircraft course recording apparatus including a flight computer providing ground speed signals of the aircraft in flight along orthogonal directions: cooperating pen and conic projection map means for plotting the flight path; drive means for imparting relative motion as between said map and pen means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of said $\theta$ output signal; means for recomputing one pair of said output signals as functions of the other output signal pair; means for comparing the recomputed and the thereto corresponding original output signal respectively to provide a pair of error signals; means responsive to said X and Y integrators for sensing "off map" and "on map" location of the flight; and means for applying said error signals to said $\phi$ and $\theta$ computers respectively under "on map" condition to force the $\phi$ and $\theta$ indications into agreement with the map flight location.

7. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the map scale factor applicable to the instant flight location as a function of one of said output signals; means for recomputing one pair of said output signals as functions of the other output signal pair; means for comparing the recomputed and thereto corresponding original output signals respectively to provide a pair of error signals; means responsive to said X and Y integrators for sensing "off map" and "on map" location of the flight; and means for applying said error signals to said $\phi$ and $\theta$ computers respectively under "on map" condition to force the $\phi$ and $\theta$ indications into agreement with the map flight location.

8. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing ($\theta$) and ($\phi$) output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the map scale factor applicable to the instant flight location as a function of said ($\phi$) output signal; means for recomputing one pair of said output signals as functions of the other output signal pair; means for comparing the recomputed and thereto corresponding original output signals respectively to provide a pair of error signals; means responsive to said integrators for sensing "off map" and "on map" location of the flight; and means for applying said X and Y error signals to said ($\phi$) and ($\theta$) computers respectively under "on map" condition to force the $\phi$ and $\theta$ indications into agreement with the map flight location.

9. In aircraft courses recording apparatus including a flight computer providing East-West and North-South ground speed signals of the aircraft in flight: cooperating pen and conic projection map means for plotting the flight path; drive means for imparting relative motion as between said map and pen means, said drive means including X and Y integrators for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of one of said output signals; means for computing the distance $\rho$ from the pole point of the projection to the instant flight location as a function of said $\phi$ output signal; means for recomputing X and Y signals as functions of the computed $\rho$ and $\delta$; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said $\phi$ and $\theta$ computers respectively under "on map" condition to force the $\phi$ and $\theta$ indications into agreement with the map flight location, and to said X and Y computers respectively under "off map" conditions to force the pen and chart means to prepare for plotting, on attaining the "on map" condition, at a location in agreement with the $\phi$ and $\theta$ indications.

10. In aircraft course recording apparatus including a flight computer providing East-West and North-South ground speed signals of the aircraft in flight: cooperating pen and conic projection map means for plotting the flight path; drive means for imparting relative motion as between said map and pen means, said drive means including X and Y integrators for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitudinal ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of said $\theta$ output signal; means for computing the distance $\rho$ from the pole point of the projection to the instant flight location as a funcion of said $\phi$ output signal; means for comparing X and Y signals as functions of the computed $\rho$ and $\delta$; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said $\phi$ and $\theta$ computers respectively under "on map" condition to force the $\phi$ and $\theta$ indications into agreement with the map flight location, and to said X and Y computers respectively under "off map" conditions to force the pen and chart means to prepare for plotting on attaining the "on map" condition at a location in agreement with the $\phi$ and $\theta$ indications.

11. In aircraft course recording apparatus including a flight computer providing East-West and North-South ground speed signals of the aircraft in flight: cooperating pen and Lambert projection map means for plotting the flight path; drive means for imparting relative motion as between said map and pen means, said drive means including X and Y integrators for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of said $\theta$ output signal, and further including means for computing the map scale factor applicable to the instant flight location as a function of said $\phi$ output signal; means for computing the distance $\rho$ from the pole point of the projection to the instant flight location as a function of said $\phi$ output signal; means for recomputing X and Y signals as functions of the computed $\rho$ and $\delta$; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said $\phi$ and $\theta$ computers respectively under "on map" conditions, to force the $\phi$ and $\theta$ indications into agreement with the map flight location, and to said X and Y computers respectively under "off map" conditions to force the pen and chart means to prepare for plotting, on attaining the "on map" condition, at a location in agreement with the $\phi$ and $\theta$ indications.

12. In aircraft course recording apparatus for plotting the flight path of the aircraft on a Lambert projection chart, said apparatus including computing means providing a signal representing the instant longitudinal position $\theta$ of said aircraft: means for computing the instant angle of meridian tilt $\delta$ on said chart, comprising means settable to provide a signal $\theta_c$ representing the chart central longitude, means for subtracting said signals to provide a difference signal $\Delta\theta$, means settable to provide a signal $h$, where $h$ is a predetermined function of the standard parallels of said chart, and means for multiplying the quantities $h$ and $\Delta\theta$ to provide an output signal $h\Delta\theta$ representing said meridian tilt angle $\delta$.

13. Aircraft course recording apparatus comprising a first pair of computers for computing instant aircraft longitude and latitude provided with a first set of indicating elements that are subject to automatic actuation by their respective computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path, both sets of actuated elements also being externally actuatable for setting in initial coordinates for the respective pairs of computers actuating the same; selector means operable to select either computer pair to operate as master computers for the other computer pair to follow as slaves; means for applying signals derived from the master computer pair to the slave computer pair to force the latter and their respective indicating elements to agreement respectively with the master computer pair and the indicating elements actuated thereby; further computer means interacting with the aforesaid computers for computing at least one earth curvature correction factor applicable to said second computer pair; indicating means actuated by the earth curvature correction factor computing means and calibrated in terms of the respective earth curvature correction factors for indicating the same; means for applying a computed earth curvature correction signal to said second computer pair to place the computer pairs and their associated indicating elements in alignment with each other; a plurality of elements settable to indicate the coordinates of a reference location and its earth curvature correction factors corresponding to the indicated earth curvature correction factors; and computing means responsive to the latter settable elements and cooperating with the aforesaid computers to compute and indicate the instant interrelation of the aircraft and reference location.

14. In aircraft course recording apparatus including a flight computer providing ground speed signals of the aircraft in flight along orthogonal directions: cooperating pen and projection map means for plotting the flight path; drive means for imparting relative motion as between said map and pen means; said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provdie longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of input signals whereby to cause the plotted instant flight location to be substantially in agreement with the latitude and longitude indications; said correction factor computing means including means for computing the map scale factor applicable to the instant flight location an a function of one of said output signals; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

15. In aircraft course recording apparatus including a flight computer providing ground speed signals of the aircraft in flight along orthogonal directions: cooperating pen and projection map means for plotting the flight path; drive means for imparting relative motion as between said map and pen means; said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of input signals whereby to cause the plotted instant flight location to be substantially in agreement with the latitude and longitude indications; said correction factor computing means including means for computing the map scale factor applicable to the instant flight location as a function of said $\phi$ output signal; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

16. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indicators and integrators, the latter for integrating a second pair of signals ultimately derived from said ground speed signals respectively and actuating their associated indicators to provide additional indication of the flight location, said latter integrators providing a second pair of output signals representative of the instant flight location, earth curvature correction factor computing means for modifying said ground speed signals in accordance with a function of at least one of said output signals to provide said first pair of input signals whereby to cause the plotted instant flight location to be substantially in agreement with the indications of said second indicator pair, means for recomputing one pair of said output signals as functions of the other output signal pair; means for comparing the recomputed and the thereto corresponding original output signals respectively to provide a pair of error signals; means responsive to said first pair of integrators for sensing presence of the flight in a predetermined area; and means responsive to such sensed presence for applying said error signals to one of said integrator pairs in addition to the integrand input signals received by such pair to force them into computational agreement with the other integrator pair and to produce complete agreement as between the two sets of flight location indications.

17. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indicators and integrators, the latter for integrating a second pair of signals ultimately derived from said ground speed signals respectively and actuating their associated indicators to provide additional indication of the flight location, said latter integrators providing a second pair of output signals representative of the instant flight location, earth curvature correction factor computing means for modifying said ground speed signals, including means for computing the map scale factor applicable to the instant flight location as a function of at least one of said output signals to provide said first pair of input signals whereby to cause the plotted instant flight location to be substantially in agreement with the indications of said second indicator pair, means for recomputing one pair of said output signals as functions of the other output signal pair; means for comparing the recomputed and the thereto corresponding original output signals respectively to provide a pair of error signals; means responsive to said first pair of integrators for sensing presence of the flight in a predetermined area; and means responsive to such sensed presence for applying said error signals to one of said integrator pairs in addition to the integrand input signals received by them to force them into computational agreement with the other integrator pair and to produce complete agreement as between the two sets of flight location indications.

18. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; means for computing a plurality of earth curvature correction factors as functions of said $\theta$ and $\phi$ signals, for modifying said ground speed signals, to provide said first pair of input signals whereby to cause the plotted instant flight location to be substantially in agreement with the latitude and longitude indications; means for recomputing said first pair of output signals as functions of two of said computed correction factors; means for comparing the recomputed and the thereto corresponding original output signals respectively to provide a pair of error signals; means responsive to said first pair of integrators for sensing "off map" and "on map" location of the flight; and means for applying said error signals to said first pair of integrators respectively under "off map" condition to prepare for plotting, on attaining the "on map" condition, at a location in agreement with the $\theta$ and $\phi$ indications.

19. In aircraft course recording apparatus including a flight computer providing ground speed signals of the aircraft in flight along orthogonal directions: cooperating pen and projecting map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; means for computing a plurality of earth curvature correction factors as functions of said $\theta$ and $\phi$ signals for modifying said ground speed signals, including means for computing the map scale factor applicable to the instant flight location, to provide said first pair of input signals whereby to cause the plotted instant flight location to be substantially in agreement with the latitude and longitude indications; means for recomputing said first pair of output signals as functions of two of said computed correction factors; means for comparing the recomputed and the thereto corresponding original output signals respectively to provide a pair of error signals; means responsive to said first pair of integrators for sensing "off map" and "on map" location of the flight; and means for applying said error signals to said first pair of integrators respectively under "off map" condition to prepare for plotting, on attaining the "on map" condition, at a location in agreement with the $\theta$ and $\phi$ indications.

20. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indicators and integrators, the latter for integrating a second pair of signals ultimately derived from said ground speed signals respectively and actuating their associated indicators to provide additional indication of the flight location, said latter integrators providing a second pair of output signals representative of the instant flight location; means for computing a plurality of earth curvature correction factors as function of the second output signal pair, for modifying said ground speed signals to provide said first pair of input signals whereby to cause the plotted instant flight location to be substantially in agreement with the indications of said second indicator pair; means for recomputing said first pair of output signals as functions of two of said computed correction factors; means for comparing the recomputed and the thereto corresponding original output signals respectively to provide a pair of error signals; means responsive to said first pair of integrators for sensing "off map" and "on map" location of the flight; and means for applying said error signals to said first pair of integrators respectively under "off map" condition to prepare for plotting on attaining the "on map" condition, at a location in agreement with said additional flight location indication.

21. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indicators and integrators, the latter for integrating a second pair of signals ultimately derived from said ground speed signals respectively and actuating their associated indicators to provide additional indication of the flight location, said latter integrators providing a second pair of output signals representative of the instant flight location; means for computing a plurality of earth curvature correction factors, including the map scale factor applicable to the instant flight location, as functions of the second output signal pair, for modifying said ground speed signals to provide said first pair of input signals whereby to cause the plotted instant flight location to be substantially in agreement with the indications of said second indicator pair; means for recomputing said first pair of output signals as functions of two of said computed correction factors; means for comparing the recomputed and the thereto corresponding original output signals respectively to provide a pair of error signals; means responsive to said first pair of integrators for sensing "off map" and "on map" location of the flight; and means for applying said error signals to said first pair of integrators respectively under "off map" condition to prepare for plotting, on attaining the "on map" condition, at a location in agreement with said additional flight location indication.

22. Aircraft course recording apparatus comprising a first pair of computers for computing instant aircraft longitude and latitude provided with a first set of indicating elements that are subject to automatic actuation by their respective computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of "on map" location and "off map" location of the flight; further computer means responsive to at least one of the aforesaid computers for computing at least one earth curvature correction factor applicable to the instant flight location; means for applying a computed earth curvature correction signal to said second computer pair to place the computer pairs and their associated indicating elements substantially in alignment with each other at least under said "on map" conditions; means for applying signals derived from the second computer pair, to the first computer pair under "on map" conditions to force said first computer pair and the indicating elements actuated thereby into agreement respectively with the second computer pair and the indicating elements actuated thereby; and means for applying signals derived from said first computer pair, to the second computer pair under "off map" conditions to prepare said second computer pair for plotting, upon attaining "on map" conditions, in agreement with the first indicating element set.

23. Aircraft course recording apparatus comprising a first pair of computers for computing instant aircraft longitude and latitude provided with a first set of indicating elements that are subject to automatic actuation by their respective computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of "on map" location and "off map location of the flight; further computer means responsive to at least one of the aforeasid computers for computing at least one earth curvature correction factor applicable to the instant flight location, namely the map scale factor; means for applying a computed earth curvature correction signal to said second computer pair to place the computer pairs and their associated indicating elements substantially in alignment with each other at least under said "on map" conditions; means for applying signals derived from the second computer pair, to the first computer pair under "on map" conditions to force said first computer pair and the indicating elements actuated thereby into agreement respectively with the second computer pair and the indicating elements actuated thereby; and means for applying signals derived from said first computer pair, to the second computer pair under "off map" conditions to prepare said second computer pair for plotting, upon attaining "on map" conditions, in agreement with the first indicating element set.

24. Aircraft course recording apparatus comprising a first pair of computers for computing instant aircraft location provided with a first set of indicating elements that are subject to automatic actuation by their respective computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; further computer means responsive to at least one of the aforesaid computers for computing at least one earth curvature correction factor applicable to the instant flight location; means for applying a computed earth curvature correction signal to said second computer pair to place the computer pairs and their associated indicating elements substantially in alignment with each other for flight locations that may be indicated by both indicating element sets; means for applying signals derived from the second computer pair, to the first computer pair under "inside predetermined area" conditions to force said first computer pair and the indicating elements actuated thereby into agreement respectively with the second computer pair and the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

25. Aircraft course recording apparatus comprising a first pair of computers for computing instant aircraft location provided with a first set of indicating elements that are subject to automatic actuation by their respecive computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; further computer means responsive to at least one of the aforesaid computers for computing at least one earth curvature correction factor, namely the map scale factor, applicable to the instant flight location; means for applying a computed earth curvature correction signal to said second computer pair to place the computer pairs and their associated indicating elements substantially in alignment with each other for flight locations that may be indicated by both indicating element sets; means for applying signals derived from the second computer pair, to the first computer pair under "inside predetermined area" conditions to force said first computer pair and the indicating elements actuated thereby into agreement respectively with the second computer pair and the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

26. Aircraft course recording apparatus comprising a first pair of computers for computing instant aircraft longitude and latitude provided with a first set of indicating elements that are subject to automatic actuation by their respective computers; a second set of indicating elements in the form of cooperating pen and conic projection map means for plotting the flight path of the aircraft; a second pair of computers for computing the instant flight location in terms of X and Y directions defining the plane of the map, said second set of indicating elements being subject to automatic actuation relative to each other by said second computer pair for relative movement whereby to plot said flight path; means responsive to said second computer pair for sensing conditions of "on map" location and "off map" location of the flight; further computer means responsive to at least one of the aforesaid computers for computing as earth curvature correction factor the meridian tilt angle applicable to the instant flight location; means for applying a computed meridian tilt angle correction signal to said second computer pair to place the computer pairs and their associated indicating elements substantially in alignment with each other at least under said "on map" conditions; means for applying signals derived from the second computer pair, to the first computer pair under "on map" conditions to force said first computer pair and the indicating elements actuated thereby into agreement respectively with the second computer pair and the indicating elements actuated thereby; and means for applying signals derived from said first computer pair, to the second computer pair under "off map" conditions to prepare said second computer pair for plotting, upon attaining "on map" conditions, in agreement with the first indicating element set.

27. Aircraft course recording apparatus comprising a first pair of computers for computing instant aircraft longitude and latitude provided with a first set of indicating elements that are subject to automatic actuation by their respective computers; a second set of indicating elements in the form of cooperating pen and conic projection map means for plotting the flight path of the aircraft; a second pair of computers for computing the instant flight location in terms of X and Y directions defining the plane of the map, said second set of indicating elements being subject to automatic actuation relative to each other by said second computer pair for relative movement whereby to plot said flight path; means responsive to said second computer pair for sensing conditions of "on map" location and "off map" location of the flight; further computer means responsive to one of the aforesaid computer pairs for computing as earth curvature correction factors the meridian tilt angle and map scale factor applicable to the instant flight location; means for applying computed meridian tilt and map scale factor correction signals to said second computer pair to place the computer pairs and their associated indicating elements substantially in alignment with each other at least under said "on map" conditions; means for applying signals derived from the second computer pair, to the first computer pair under "on map" conditions to force said first computer pair and the indicating elements actuated thereby into agreement respectively with the second computer pair and the indicating elements actuated thereby; and means for applying signals derived from said first computer pair, to the second computer pair under "off map" conditions to prepare said second computer pair for plotting, upon attaining "on map" conditions, in agreement with the first indicating element set.

28. Aircraft course recording apparatus comprising a first pair of computers for computing instant aircraft location provided with a first set of indicating elements that are subject to automatic actuation by their respective computers; a second set of indicating elements in the form of cooperating pen and conic projecting map means for plotting the flight path of the aircraft; a second pair of computers for computing the instant flight location in terms of X and Y directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; further computer means responsive to at least one of the aforesaid computers for computing as earth curvature correction factor the meridian tilt angle applicable to the instant flight location; means for applying a computed meridian tilt angle correction signal to said second computer pair to place the computer pairs and their associated indicating elements substantially in alignment with each other for flight locations that may be indicated by both indicating sets; means for applying signals derived from the second computer pair, to the first computer pair under "inside predetermined area" conditions to force said first computer pair and the indicating elements actuated thereby into agreement respectively with the second computer pair and the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

29. Aircraft course recording apparatus comprising a first pair of computers for computing instant aircraft location provided with a first set of indicating elements that are subject to automatic actuation by their respective computers; a second set of indicating elements in the form of cooperating pen and conic projection map means for plotting the flight path of the aircraft; a second pair of computers for computing the instant flight location in terms of X and Y directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; further computer means responsive to one of the aforesaid computer pairs for computing as earth curvature correction factor the meridian tilt angle and map scale factor applicable to the instant flight location; means for applying computed meridian tilt angle and scale factor correction signals to said second computer pair to place the computer pairs and their associated indicating elements substantially in alignment with each other for flight locations that may be indicated by both indicating sets; means for applying signals derived from the second computer pair, to the first computer pair under "inside predetermined area" conditions to force said first computer pair and the indicating elements actuated thereby into agreement respectively with the second computer pair adn the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

30. In aircraft course recording apparatus including a flight computer providing ground speed signals of the aircraft in flight along orthogonal directions: cooperating pen and projection map means for plotting the flight path; drive means for imparting relative motion as between said map and pen means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; means for computing a plurality of earth curvature correction factors as functions of one of the output signal pairs, and means for recomputing the other output signal pair as functions of two computed earth curvature correction factor signals, the earth curvature correction computing means modifying said ground speed signals to provide said first pair of input signals whereby to cause the plotted instant flight location to be substantially in agreement with the latitude and longitude indications; means for comparing the recomputed and the thereto corresponding original output signals respectively to provide a pair of error signals; means responsive to said first pair of integrators for sensing "off map" and "on map" location of the flight; and means for applying said error signals to said other pair of integrators respectively under that one of the "on map" and "off map" conditions for which the computation of said other integrator pair would otherwise be less accurate than the computation of said one integrator pair, thereby to effect full computational agreement among said integrator pairs.

31. Aircraft course recording apparatus comprising a first pair of computers for computing instant aircraft location provided with a first set of indicating elements that are subject to automatic actuation by their respective computers; a second set of indicating elements in the form of cooperating pen and projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; means for applying signals derived from the second computer pair, to the first computer pair under "inside predetermined area" conditions to force said first computer pair and the indicating elements actuated thereby into agreement respectively with the second computer pair and the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

References Cited in the file of this patent
UNITED STATES PATENTS

| | | |
|---|---|---|
| 2,560,528 | Debmel | July 10, 1951 |
| 2,829,446 | Cutler | Apr. 8, 1958 |
| 2,853,800 | Cutler | Sept. 30, 1958 |
| 2,857,234 | Murry | Oct. 21, 1958 |
| 2,878,585 | Steiner | Mar. 24, 1959 |